(12) United States Patent
Kuniba

(10) Patent No.: US 8,115,857 B2
(45) Date of Patent: Feb. 14, 2012

(54) DIGITAL CAMERA AND IMAGE PROCESSING COMPUTER PROGRAM PRODUCT

(75) Inventor: Hideyasu Kuniba, Tokyo (JP)

(73) Assignee: Nikon Corporation, Tokyo (JP)

( * ) Notice: Subject to any disclaimer, the term of this patent is extended or adjusted under 35 U.S.C. 154(b) by 473 days.

(21) Appl. No.: 12/309,821

(22) PCT Filed: Aug. 9, 2007

(86) PCT No.: PCT/JP2007/065657
§ 371 (c)(1),
(2), (4) Date: Jan. 30, 2009

(87) PCT Pub. No.: WO2008/018564
PCT Pub. Date: Feb. 14, 2008

(65) Prior Publication Data
US 2009/0244329 A1   Oct. 1, 2009

(30) Foreign Application Priority Data
Aug. 11, 2006   (JP) ................. 2006-219755

(51) Int. Cl.
H04N 5/235   (2006.01)
(52) U.S. Cl. .............. 348/362; 348/222.1; 348/254
(58) Field of Classification Search .......... 348/222.1, 348/229.1, 230.1, 241, 250, 254, 362, 364; 358/521
See application file for complete search history.

(56) References Cited

U.S. PATENT DOCUMENTS

| 4,951,082 A | 8/1990 | Takagi |
| 6,900,886 B2 * | 5/2005 | Yuasa ................ 356/218 |
| 2004/0207736 A1 | 10/2004 | Muramatsu |

FOREIGN PATENT DOCUMENTS

| JP | A-2000-138862 | 5/2000 |
| JP | A-2001-54014 | 2/2001 |
| JP | A-2001-189890 | 7/2001 |
| JP | A-2003-46848 | 2/2003 |
| JP | A-2004-229054 | 8/2004 |
| JP | A-2005-65176 | 3/2005 |
| JP | A-2006-109327 | 4/2006 |
| JP | A-2006-203571 | 8/2006 |

\* cited by examiner

*Primary Examiner* — Darryl J Collins
(74) *Attorney, Agent, or Firm* — Oliff & Berridge, PLC

(57) ABSTRACT

A digital camera includes: a photometering unit that measures brightness of a photographic field by dividing the field into a plurality of areas; a reference value calculation unit that calculates, a first value to be used to determine exposure conditions for a photographing operation based upon photometering results provided by the photometering unit and also calculates a second value to be used to set gradation conversion characteristics in conformance to which gradation correction is to be executed on a photographic image photographed based upon the results; an exposure condition determining unit that determines the conditions for the operation based upon the first value; a gradation conversion characteristics setting unit that sets the characteristics based upon the second reference value; and an image processing unit that executes image processing including gradation conversion executed by using the gradation conversion characteristics on the photographic image obtained under the conditions via an imaging unit.

23 Claims, 25 Drawing Sheets

(a) (b)

2a

Figure 1:
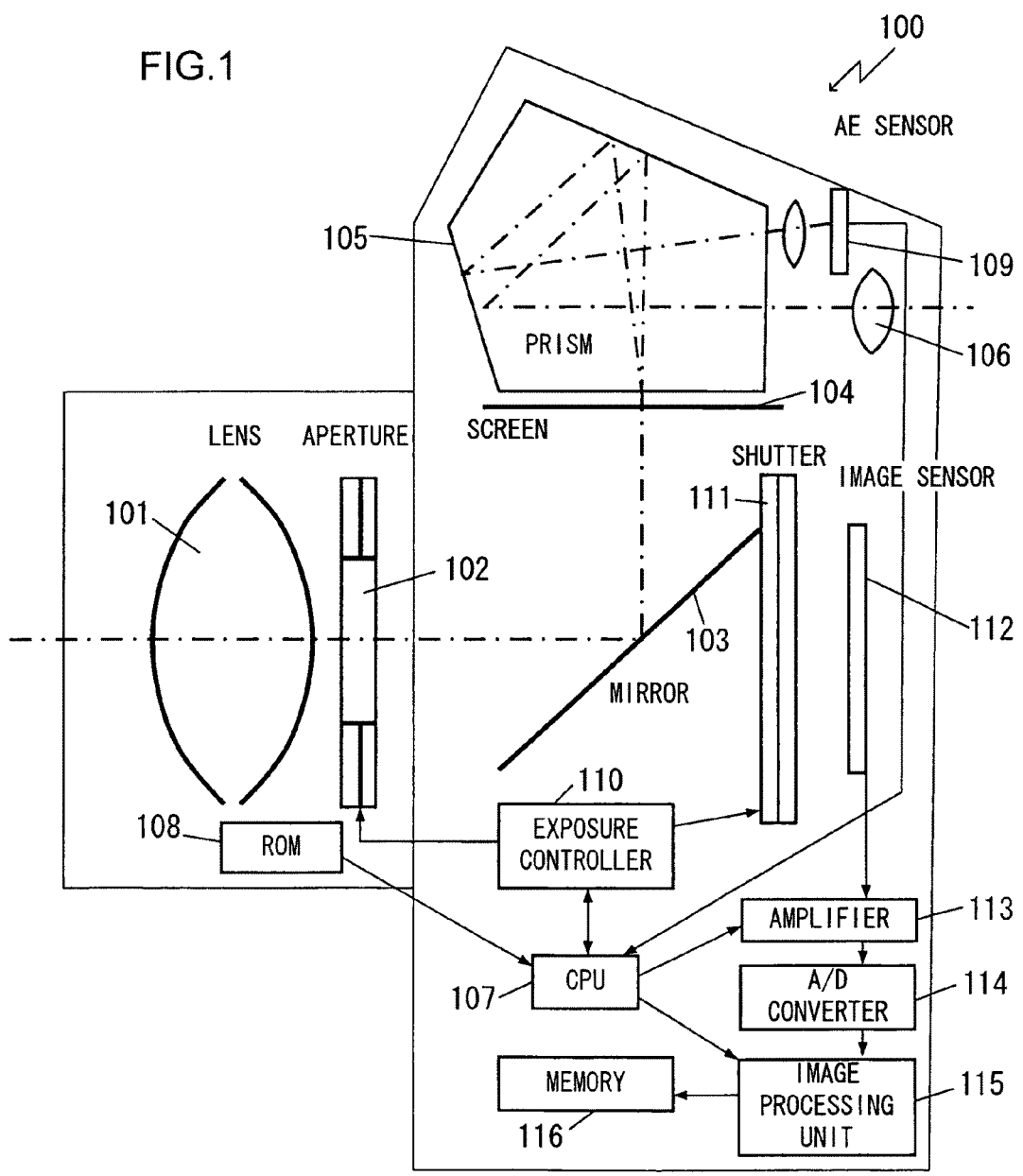

| 2973 | 1914 | 1170 | 834 |
| 2505 | 1299 | 1071 | 732 |
| 1192 | 743 | 558 | 271 |
| 1113 | 444 | 305 | 263 |
| 774 | 232 | 217 | 89 |
| 295 | 211 | 194 | 60 |

(a)

(b)

(a)

(b)

(c)

(a)

(b)

FIG.16

(a) R

| R | | | |
|---|---|---|---|
| 1650 | 1425 | 1120 | 831 |
| 2078 | 1289 | 1056 | 722 |
| 1171 | 738 | 495 | 253 |
| 1040 | 442 | 283 | 233 |
| 679 | 221 | 209 | 64 |
| 272 | 181 | 173 | 44 |

(b) G

| G | | | |
|---|---|---|---|
| 1939 | 1366 | 875 | 627 |
| 1972 | 979 | 802 | 546 |
| 901 | 554 | 426 | 212 |
| 880 | 337 | 244 | 217 |
| 638 | 184 | 174 | 75 |
| 260 | 183 | 171 | 59 |

(c) B — 16a

| B | | | |
|---|---|---|---|
| 2960 | 1783 | 919 | 631 |
| 2335 | 986 | 801 | 551 |
| 934 | 558 | 497 | 245 |
| 954 | 347 | 279 | 250 |
| 721 | 183 | 168 | 72 |
| 261 | 155 | 132 | 21 |

DIGITAL CAMERA AND IMAGE PROCESSING COMPUTER PROGRAM PRODUCT

TECHNICAL FIELD

The present invention relates to a digital camera used to photograph an image and an image processing computer program product that may be utilized when executing image processing on the photographed image.

BACKGROUND OF THE INVENTION

There is a camera known in the related art that divides the photographic field into a plurality of photometering target areas and selects the optimal exposure conditions based upon the highest brightness values and the lowest brightness values measured in the individual areas, the differences between the brightness values in the separate areas and a maximum brightness value and the like (see patent reference literature 1). In such a camera, an average photometering mode, a center priority mode, a low brightness priority mode, a high brightness priority mode or the like may be selected.

Patent reference literature 1: U.S. Pat. No. 4,951,082

DISCLOSURE OF THE INVENTION

Problems to be Solved by the Invention

However, since the brightness level at which the main subject is most likely to be photographed is selected as the optimal exposure conditions in the method in the related art, bright image portions in a scene with a significant variance in the brightness may reach the saturation limit of the image sensor, to result in whiteout smearing and a poor image quality.

Means for Solving the Problems

According to the 1st aspect of the present invention, a digital camera comprises: a photometering unit that measures brightness of a photographic field by dividing the photographic field into a plurality of areas; a reference value calculation unit that calculates, a first reference value to be used to determine exposure conditions for a photographing operation based upon photometering results provided by the photometering unit and also calculates a second reference value, different from the first reference value, to be used to set gradation conversion characteristics in conformance to which gradation correction is to be executed on a photographic image photographed based upon the photometering results; an exposure condition determining unit that determines the exposure conditions for the photographing operation based upon the first reference value; a gradation conversion characteristics setting unit that sets the gradation conversion characteristics based upon the second reference value; and an image processing unit that executes image processing including gradation conversion executed by using the gradation conversion characteristics on the photographic image obtained under the exposure conditions via an imaging unit.

According to the 2nd aspect of the present invention, in the digital camera according to the 1st aspect, it is preferred that the reference value calculation unit determines a certain area having received a greatest quantity of light among the plurality of areas based upon the photometering results provided by the photometering unit and designates an output value corresponding to the certain area as the first reference value; and the reference value calculation unit calculates white reference value corresponding to a brightness level that can be regarded to indicate white based upon the photometering results provided by the photometering unit and designates a pixel value equivalent to the white reference value as the second reference value.

According to the 3rd aspect of the present invention, in the digital camera according to the 2nd aspect, it is preferred that the gradation conversion characteristics setting unit sets the gradation conversion characteristics so that the pixel value corresponding to the second reference value in the photographic image assumes a brightness value indicating white.

According to the 4th aspect of the present invention, in the digital camera according to the 3rd aspect, it is preferred that the digital camera further comprises: a gradation conversion characteristics correction unit that corrects the gradation conversion characteristics by altering a slope of the gradation conversion characteristics at a predetermined point, so that even when the pixel value corresponding to the brightness value indicating white is smaller than a largest pixel value among pixel values at pixels constituting the photographic image, pixel values in a range between the pixel value corresponding to the brightness value indicating white and the largest pixel value in the photograph image do not saturate.

According to the 5th aspect of the present invention, in the digital camera according to the 4th aspect, it is preferred that the gradation conversion characteristics correction unit alters the slope of the gradation conversion characteristics if a ratio of the first reference value and the second reference value is equal to or greater than a predetermined value.

According to the 6th aspect of the present invention, in the digital camera according to the 4th or the 5th aspect, it is preferred that the gradation conversion characteristics correction unit alters the slope of the gradation conversion characteristics if a ratio of a bright area within a photometering range of the photometering unit is high.

According to the 7th aspect of the present invention, in the digital camera according to any one of the 1st through 6th aspects, it is preferred that the digital camera further comprises: a photographic sensitivity calculation unit that calculates a photographic sensitivity value corresponding to the second reference value; and a recording unit that records into a recording medium image data that include the photographic image and information indicating the photographic sensitivity value appended to the photographic image.

According to the 8th aspect of the present invention, in the digital camera according to the 1st aspect, it is preferred that the digital camera further comprises: a noise level estimating unit that estimates a noise level indicating a level of noise in the photographic image. It is also preferred that the exposure condition determining unit determines the exposure conditions for the photographing operation so that a ratio of the first reference value and the second reference value does not exceed a predetermined value corresponding to the noise level estimated by the noise level estimating unit.

According to the 9th aspect of the present invention, in the digital camera according to the 1st aspect, it is preferred that the digital camera further comprises: a noise level estimating unit that estimates a noise level indicating a level of noise in the photographic image; and a noise reducing unit that reduces the noise by applying a noise reducing filter corresponding to the noise level to image data having undergone the image processing at the image processing unit.

According to the 10th aspect of the present invention, in the digital camera according to the 1st aspect, it is preferred that the digital camera further comprises: an exposure state measuring unit that measures an actual exposure state manifesting as the imaging unit is engaged in imaging operation; and a reference value correction unit that corrects the second reference value based upon the actual exposure state if there is a discrepancy between the actual exposure state measured via the exposure state measuring unit and the exposure conditions determined by the exposure condition determining unit.

According to the 11th aspect of the present invention, in the digital camera according to the 1st aspect, it is preferred that the digital camera further comprises: an exposure condition setting unit that sets exposure conditions in response to an instruction issued by a user; and a reference value correction unit that corrects the second reference value based upon the exposure conditions having been set via the exposure condition setting unit.

According to the 12th aspect of the present invention, in the digital camera according to the 1st aspect, it is preferred that the digital camera further comprises: a photographic sensitivity setting unit that sets a photographic sensitivity level in response to an instruction issued by a user; an altering unit that alters an amplification factor and the exposure conditions having been determined by the exposure condition determining unit based upon a ratio of the first reference value and the second reference value calculated in correspondence to the setting selected at the photographic sensitivity setting unit; and a signal amplifier unit that amplifies image signals obtained via the imaging unit at the amplification factor having been altered via the altering unit.

According to the 13th aspect of the present invention, in the digital camera according to the 12th aspect, it is preferred that the digital camera further comprises: a photographic sensitivity calculation unit that calculates a photographic sensitivity value corresponding to the amplification factor having been altered by the altering unit and the second reference value; and a recording unit that records into a recording medium image data that include the photographic image and information indicating the photographic sensitivity value appended to the photographic image.

According to the 14th aspect of the present invention, in the digital camera according to the 1st aspect, it is preferred that the photometering unit assumes a plurality of sets of different spectral sensitivity characteristics; and the digital camera further comprises a photometering results correction unit that corrects the photometering results provided by the photometering unit if the spectral sensitivity of the photometering unit and the spectral sensitivity of the imaging unit do not match.

According to the 15th aspect of the present invention, in the digital camera according to the 2nd aspect, it is preferred that the gradation conversion characteristics setting unit sets gradation conversion characteristics corresponding to an output value from each area among the plurality of areas; and the image processing unit executes gradation conversion processing for each area by using the gradation conversion characteristics set by the gradation conversion characteristics setting unit.

According to the 16th aspect of the present invention, in the digital camera according to the 1st aspect, it is preferred that the digital camera further comprises: a light emission unit that emits light as an image is captured via the imaging unit; a light emission quantity detection unit that detects a quantity of light emitted from the light commission unit; and a reference value correction unit that corrects the second reference value based upon detection results provided by the light emission quantity detection unit.

According to the 17th aspect of the present invention, in the digital camera according to the 1st aspect, it is preferred that the digital camera further comprises: a face detection unit that detects a face area containing a person's face in the image obtained via the imaging unit; and a reference value correction unit that corrects the second reference value based upon an output value from the face area having been obtained through measurement executed by the photometering unit.

According to the 18th aspect of the present invention, a digital camera comprises: a photometering unit that measures brightness of a photographic field by dividing the photographic field into a plurality of areas; a reference value calculation unit that calculates a first reference value to be used to determine exposure conditions for a photographing operation based upon photometering results provided by the photometering unit, and also calculates a second reference value, different from the first reference value, to be used to set gradation conversion characteristics in conformance to which gradation correction is to be executed on a photographic image photographed based upon the photometering results; an exposure condition determining unit that determines the exposure conditions for the photographing operation based upon the first reference value; a gradation conversion characteristics setting unit that compares the first reference value with the second reference value, sets the gradation conversion characteristics based upon the second reference value if the first reference value is less than the second reference value and sets preselected gradation conversion characteristics if the first reference value is equal to or greater than the second reference value; and an image processing unit that executes image processing including gradation conversion executed by using the gradation conversion characteristics on the photographic image obtained under the exposure conditions via an imaging unit.

According to the 19th aspect of the present invention, a digital camera comprises: a photometering unit that measures brightness of a photographic field by dividing the photographic field into a plurality of areas; a reference value calculation unit that calculates a first reference value to be used to determine exposure conditions for a photographing operation based upon photometering results provided by the photometering unit, and also calculates a second reference value, different from the first reference value, to be used to set gradation conversion characteristics in conformance to which gradation correction is to be executed on a photographic image; and an exposure condition determining unit that determines that exposure conditions for the photographing operation based upon the first reference value; and a recording unit that records into a recording medium image data that include a photographic image obtained under the exposure conditions via an imaging unit and the second reference value appended to the photographic image.

According to the 20th aspect of the present invention, an image processing computer program product has contained therein an image processing program. The image processing program enables a computer to execute; a read step in which the image data according to the 19th aspect are read; a gradation conversion characteristics setting step in which gradation conversion characteristics are set for the photographic image included in the image data having been read based upon the second reference value appended to the photographic image; and an image processing step in which image processing, including gradation conversion executed by using the gradation conversion characteristics, is executed on the photographic image.

According to the 21th aspect of the present invention, an image processing computer program product has contained therein an image processing program. The image processing program enables a computer to execute; a reference value calculation step in which a first reference value to be used to determine exposure conditions for a photographing operation based upon photometering results obtained by photometering a photographic field divided into a plurality of areas is calculated and a second reference value, different from the first reference value, to be used to set gradation conversion characteristics in conformance to which gradation correction is to be executed on a photographic image photographed based upon the photometering results, is calculated; a read step in which image data obtained by photographing the image a based upon the photometering results are read; a gradation conversion characteristics setting step in which gradation conversion characteristics are set for the photographic image included in the image data having been read based upon the second reference value appended to the photographic image; and an image processing step in which image processing, including gradation conversion executed by using the gradation conversion characteristics, is executed on the photographic image.

Advantageous Effect of the Invention

According to the present invention adopting the structure described above, it is possible to avoid whiteout smearing by preventing the image sensor from becoming saturated and thus, the image quality is not as likely to be compromised.

BRIEF DESCRIPTION OF THE DRAWINGS (FIG. 1) A block diagram showing the structure adopted in a digital camera achieved in a first embodiment (FIG. 2) A photographic scene and an example of the output from the AE sensor 109

(FIG. 3) A block diagram showing the individual units engaged in the execution of the processing characterizing the first embodiment (FIG. 4) Calculation results provided by the normal exposure calculation unit 107b (FIG. 5) A block diagram of the image processing unit 115 achieved in the first embodiment (FIG. 6) First graphs presenting specific examples of gradation conversion characteristics (FIG. 7) A second graph presenting a specific example of gradation conversion characteristics (FIG. 8) Third graphs presenting specific examples of gradation conversion characteristics (FIG. 9) A first block diagram showing the individual units engaged in the execution of the processing characterizing a second embodiment (FIG. 10) A graph indicating the relationship of the ratio of the largest output value and the white reference value to the estimated noise level value as observed in the second embodiment (FIG. 11) A second block diagram showing the individual units engaged in the execution of the processing characterizing the second embodiment (FIG. 12) A block diagram showing the individual units engaged in the execution of the processing characterizing a third embodiment (FIG. 13) A block diagram showing the individual units engaged in the execution of the processing characterizing a fourth embodiment (FIG. 14) A block diagram showing the individual units engaged in the execution of the processing characterizing a fifth embodiment (FIG. 15) A block diagram showing the individual units engaged in the execution of the processing characterizing a sixth embodiment (FIG. 16) The output distributions each corresponding to a specific color component, as observed in the sixth embodiment (FIG. 17) A block diagram showing the individual units engaged in the execution of the processing characterizing a seventh embodiment (FIG. 18) A block diagram of the image processing unit 115 achieved in the seventh embodiment (FIG. 19) A block diagram showing the structure adopted in a digital camera 100 achieved in an eighth embodiment (FIG. 20) A block diagram showing the individual units engaged in the execution of the processing characterizing the eighth embodiment (FIG. 21) A block diagram showing the individual units engaged in the execution of the processing characterizing a ninth embodiment (FIG. 22) A block diagram showing the individual units engaged in the execution of the processing characterizing a tenth embodiment (FIG. 23) The processing executed at the digital camera 100 in a variation (FIG. 24) The processing executed at the external device in the variation (FIG. 25) An illustration showing how the program may be provided to a personal computer

BEST MODE FOR CARRYING OUT THE INVENTION

First Embodiment

FIG. 1 is a block diagram showing the structure adopted in a digital camera achieved in the first embodiment. A digital camera 100 includes a lens 101, an aperture 102, a mirror 103, a screen 104, a prism 105, a viewfinder 106, a CPU 107, a ROM 108, an AE sensor (photometering sensor) 109, an exposure controller 110, a shutter 111, an image sensor (image pickup device) 112, an amplifier 113, an A/D converter 114, an image processing unit 115 and a memory 116.

The quantity of light having passed through the lens 101 to further advance in the digital camera 100 is adjusted at the aperture 102. The light is reflected at the mirror 103 and forms an image at the screen 104. The image is reflected at the prism 105 and is observed by the user through the viewfinder 106. In addition, the image reflected at the prism 105 is also guided to the AE sensor 109 and output values from the AE sensor 109 are provided to the CPU 107. Based upon the output values provided from the AE sensor 109, the CPU 107 determines the exposure conditions controlled via the exposure controller 110, under which a photographing operation is to be executed, i.e., the optimal aperture value and shutter speed for the photographing operation. It may also determine photographing conditions other than the exposure conditions by, for instance, adjusting the amplifier 113. It also determines image processing conditions under which image processing is to be executed by the image processing unit 115.

When the exposure conditions are to be adjusted, the exposure conditions determined by the CPU 107 are output to the exposure controller 110 and the image processing unit 115. An image is photographed as the mirror 103 moves upward to retreat from the photographic light path and the light input through the lens 101 enters the image sensor 112. The exposure controller 110 controls the aperture 102 and the shutter 111 so as to achieve the exposure conditions having been selected by the CPU 107, and the image sensor 112 captures the image formed by the entering light. The output from the image sensor 112 is first amplified at a predetermined amplification factor at the amplifier 113 and then is converted to, for instance, 12-bit digital image data (maximum pixel value 4095) through A/D conversion executed at the A/D converter 114. The digital image data then undergo image processing to be detailed later at the image processing unit 115 based upon the image processing conditions having been determined by the CPU 107 and the image data resulting from the image processing are recorded into the memory 116.

The AE sensor 109 is divided into 4×6 areas and the photometering results output from the AE sensor 109 when photographing the scene shown in FIG. 2(a) may be as shown in FIG. 2(b). In FIG. 2(b), the numerical value indicated in each area represents the brightness of the particular area. It is to be noted that while the output values provided from the AE sensor 109 and the output values (pixel values) provided from the image sensor 112 do not always match, these two types of values do have a correlation to each other. Accordingly, the description of the embodiment is simplified by assuming that the output values from the AE sensor 109 and the output values from the image sensor 112 are first normalized so that they match each other. In the following description, it is assumed that the output values corresponding to the individual areas in FIG. 2(b) are values normalized so that the output value corresponding to a given area provided by the AE sensor assumes a value equal to the output value, i.e., the pixel value, corresponding to the area provided by the image sensor 112 at a given-brightness level.

Figure 3:
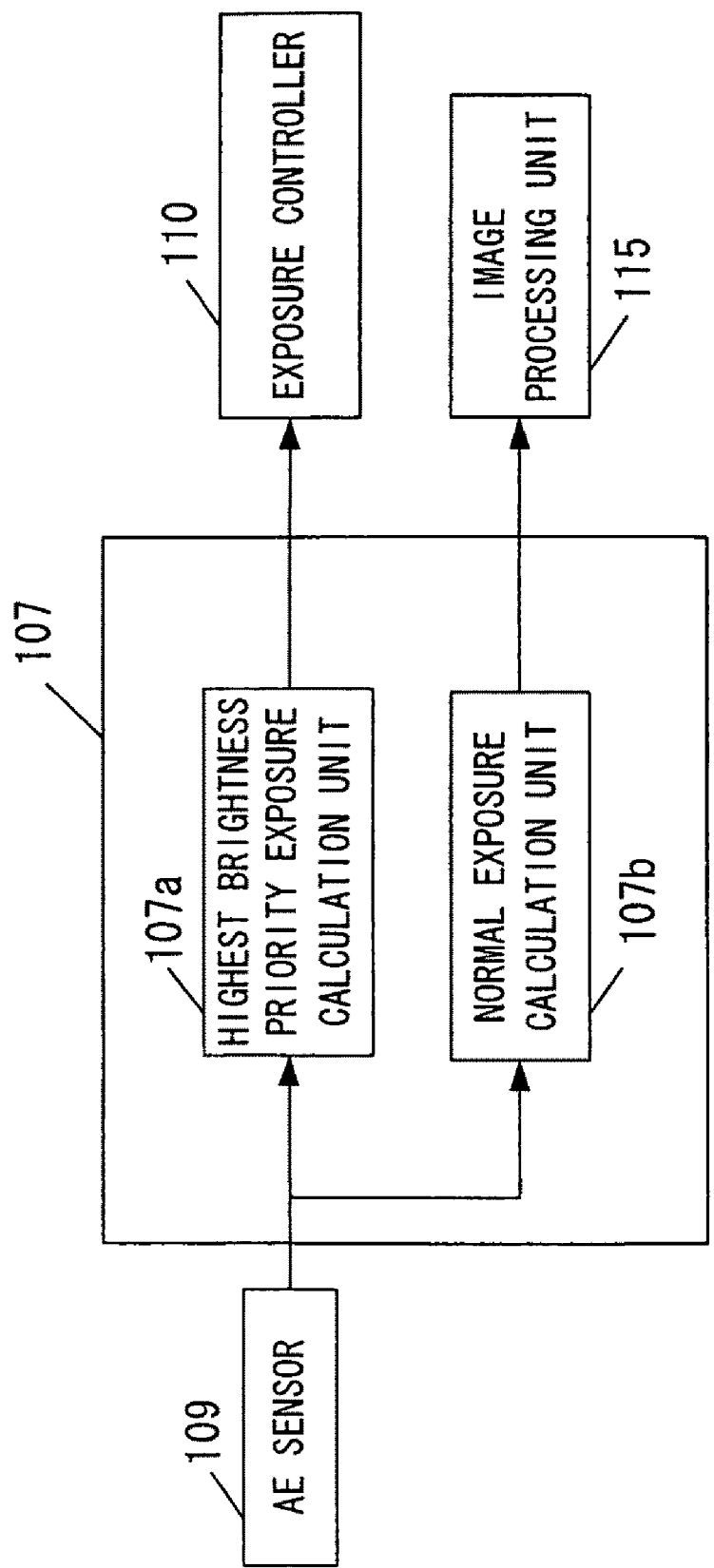

As described above, the CPU 107 determines the exposure conditions and the image processing conditions based upon the output values from the AE sensor 109. FIG. 3 is a block diagram showing the individual units engaged in the execution of the processing characterizing the embodiment. It is to be noted that the processing executed by the CPU 107 is illustrated in functional blocks in the block diagram. Namely, the CPU 107 includes functional units, i.e., a highest brightness priority exposure calculation unit 107a that determines the exposure conditions and a normal exposure calculation unit 107b that determines the image processing conditions, with the output values provided from the AE sensor 109 individually input to the highest brightness priority exposure calculation unit 107a and the normal exposure calculation unit 107b.

The highest brightness priority exposure calculation unit 107a determines the exposure conditions based upon the largest value (largest output value) among the output values corresponding to the individual areas shown in FIG. 2(b). In the example presented in FIG. 2(b), the output value (2973) corresponding to an area 2a is the largest and, accordingly, the exposure conditions are determined based upon the output value corresponding to the area 2a. In the embodiment, the aperture value and the shutter speed for the photographing operation are determined so as to achieve the highest brightness value of 3000 for the photographed image data by taking into consideration that the brightness is dispersed within the area 2a.

By setting the exposure conditions so as to achieve a largest output value of approximately 3000 from the AE sensor 109, i.e., a brightness value (≈pixel value) of approximately 3000 for the image data in the area 2a, as described above, an aperture value and a shutter speed that shall not allow saturation at the image sensor 112 with a largest output value of 4095, can be selected. For instance, assuming that the ISO sensitivity (ISO speed) is 200, an aperture value of F 5.6 and a shutter speed of 1/800 are selected in the embodiment. The highest brightness priority exposure calculation unit 107a outputs the exposure conditions thus determined to the exposure controller 110, which, in turn, controls the aperture 102 and the shutter 111 so as to achieve the exposure conditions input thereto.

The normal exposure calculation unit 107b calculates an exposure reference value B by adopting a method of the known art, such as that disclosed in U.S. Pat. No. 4,951,082. The normal exposure calculation unit 107b calculates a mean output value BM by averaging the values corresponding to all the areas representing the output results provided by the AE sensor 109, as shown in FIG. 2(b). The mean output value BM is calculated to be 810, as shown in FIG. 4(a). In addition, the image formed via the lens 101 is analyzed based upon the output from the AE sensor 109 to determine a specific scene having been photographed and then a method to be adopted to calculate the exposure reference value B is selected in correspondence to the particular scene. The image in FIG. 2(a) is obtained by photographing a scene for which a low brightness priority mode should be selected. Accordingly, the following description is provided by assuming that the low brightness priority mode has been selected.

In addition, the normal exposure calculation unit 107b groups the areas in correspondence to which the output values are provided by the AE sensor 109 into nine areas, calculates the mean output value for each area group and extracts the smallest value Bmin among the calculated average values. In this example, 114 corresponding to an area group 4a is extracted as Bmin. Then, based upon BM having been calculated and Bmin, it calculates the exposure reference value B as expressed in (1) below.

$$B=(BM+B\mathrm{min})/2=462 \tag{1}$$

This exposure reference value B may be regarded as the brightness (gray reference value) indicating the average gray level in the image obtained by photographing the scene in FIG. 2(a) with the image sensor 112. In addition, since the reflectance of gray is approximately 18%, the brightness (white reference value) that can be regarded as white within the image obtained by photographing the scene in FIG. 2(a) with the image sensor 112 can be calculated by multiplying the gray reference value by 5. It is to be noted that for purposes of simplification, the embodiment is described by assuming that the gray reference value indicated in the results of the calculation executed as expressed in (1) is approximately 400 and that the white reference value is approximately 2000, i.e., five times the gray reference value. The normal exposure calculation unit 107b outputs the white reference value thus calculated to the image processing circuit 115 where the white reference value is used as the image processing conditions.

Figure 5:
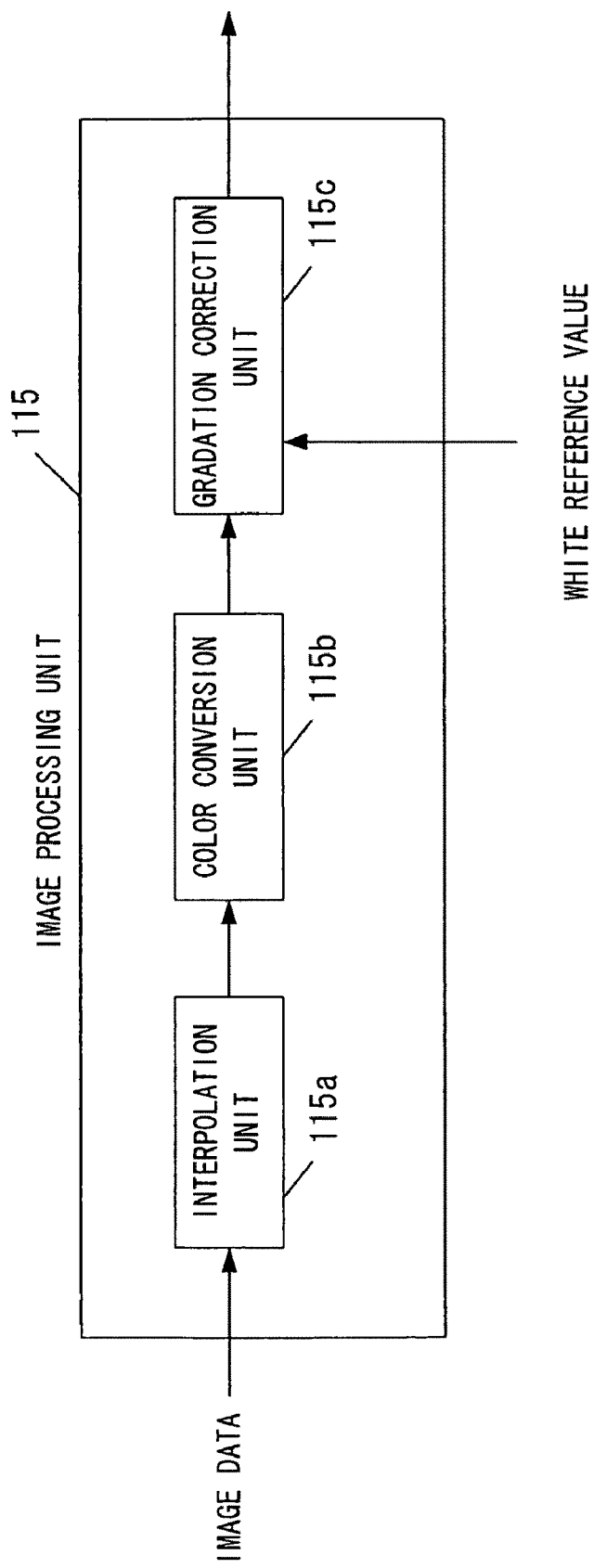

The image processing unit 115 executes, based upon the white reference value input thereto from the normal exposure calculation unit 107b, image processing on the digital image data obtained by photographing the scene with the image sensor 112 under the exposure conditions set by the exposure controller 110 and input thereto via the amplifier 113 and the A/D converter 114. FIG. 5 is a block diagram showing the functional blocks of the processing executed by the image processing unit 115. As shown in FIG. 5, the image processing unit 115 includes functional units; an interpolation unit 115a, a color conversion unit 115b and a gradation correction unit 115c and the image data input from the A/D converter 114 are input to the interpolation unit 115a. In addition, the white reference value input from the normal exposure calculation unit 107b is input to the gradation correction unit 115c.

The interpolation unit 115a executes interpolation processing of the known art on the image data input from the image sensor 112. Namely, the pixels constituting the image sensor 112 are each equipped with an R color filter, a G color filter or a B color filter and the image data input from the image sensor 112 are thus made up with data representing a specific color among R, G and B in correspondence to each pixel. Since data representing all the three colors R, G and B must be provided in correspondence to each pixel in color image data, interpolation is executed by using data at nearby pixels so as to provide data corresponding to all the three colors R, G and B at each pixel.

Following the interpolation processing, the image data are output to the color conversion unit 115b. The color conversion unit 115b executes processing on the image data, such as correction of the spectral sensitivity characteristics of the image sensor 112 and color conversion to assure desirable color reproduction, through a method of the known art and then outputs the processed image data to the gradation correction unit 115c.

The gradation correction unit 115c executes gradation conversion on the image data input thereto from the color conversion unit 115b, in correspondence to the white reference value input from the normal exposure calculation unit 107b. In more specific terms, it determines gradation conversion characteristics to be used in the gradation conversion based upon the largest value (4095) indicated in the input image data and the white reference value (2000) input from the normal exposure calculation unit 107b. Namely, it sets the gradation conversion characteristics that shall allow the white reference value input from the normal exposure calculation unit 107b to indicate white, as shown in FIG. 6(a). In this example, gradation conversion characteristics are selected so that the target image data is assumed to be in sRGB 8-bit encoding, the pixel value corresponding to the white reference value is equivalent to a brightness value of 255.

Since information is lost once the input pixel value exceeds 2000, specific knee characteristics such as those shown in FIG. 6(b) are assumed so as to retain in formation for a highlighted area. Namely, if the pixel value corresponding to the white reference value is smaller than the largest output value, the slope of the gradation conversion characteristics is altered for correction at a specific point (knee point), so as to ensure that the median value between the pixel value corresponding to the white reference value and the largest output value does not become saturated.

In the example presented in FIG. 6(b), the gradation conversion characteristics are corrected at a knee point 6a set at a position at which the pixel value is 1000, i.e., half the white reference value. It is to be noted that the knee point may be set at a position other than this and it may be set at a point 6b at which the pixel value is 400, i.e., one fifth of the white reference value, as shown in FIG. 6(c). In particular, if the ratio of the highlighted area is significant, larger range for the gradation in the highlighted area can be secured by setting the knee point at a position at which both the input value and the output value are small.

In addition, when the photographic scene has a large dynamic range, i.e., if the ratio of the bright area is significant, or if the ratio of the largest output value calculated by the highest brightness priority exposure calculation unit 107a and the white reference value calculated by the normal exposure calculation unit 107b is equal to or greater than a predetermined value, the knee point may be set at a position at which the input value is low, so as to secure larger range for the gradation in the highlighted area.

The gradation correction unit 115c executes gradation conversion on the input image data by using the gradation correction characteristics selected as described above and records the image data resulting from the conversion into the memory 116.

FIG. 7(a) shows the gradation correction characteristics selected when the white reference value is 4000. In this case, no knee correction is required, since the white reference value substantially matches the largest output value. FIG. 8 shows gradation correction characteristics that may be selected when the white reference value is 1000. In this situation, similar to that in which the white reference value is 2000, the information will be lost once the input pixel value exceeds the white reference value and, accordingly, the gradation conversion characteristics must be corrected at a knee point 8a, at which the pixel value is 500, i.e., half the white reference value, as shown in FIG. 8(a), or at a knee point 8b, at which the pixel value is 100, i.e., one fifth of the white reference value, as shown in FIG. 8(b).

In addition, image data that include sensitivity setting data indicating the sensitivity setting selected for the photographing operation, appended to the photographed image, can be recorded into the memory 116 in the digital camera 100 in the embodiment. By storing the sensitivity setting data together with the image data yet to undergo gradation correction, accurate gradation correction can be executed later on a PC or the like. When the gradation correction is executed on a PC or the like, the amplification factor setting selected at the amplifier 113 and the sensitivity setting data corresponding to the white reference value should be appended to the photographic image. For instance, assuming that the sensitivity setting data indicate 200 when the white reference value is 4000 at a given amplification factor setting, sensitivity setting data indicating 400 should be appended to the photographic image in correspondence to a white reference value of 2000 at the same amplification factor setting. In addition, when the white reference value is 1000, the sensitivity setting data appended to the photographic image should indicate 800.

The following advantages are achieved through the first embodiment described above.

(1) The highest brightness priority exposure calculation unit 107a uses the largest output value as the reference value based upon which the exposure conditions are determined, whereas the normal exposure calculation unit 107b uses the white reference value as the reference value based upon which the image processing conditions are determined. As a result, whiteouts that would compromise the image quality in the related art in bright areas in a scene with a broad range of brightness, in which the bright areas would reach the saturation level of the image sensor, can be avoided and the optimal processing can be executed.

(2) If the white reference value is smaller than the largest value indicated in the image data, the gradation conversion characteristics are corrected to take on knee characteristics. As a result, the information can be retained even when the input pixel value exceeds the white reference value.

Second Embodiment

In the second embodiment, the exposure conditions and the image processing conditions for the photographing operation and the image processing conditions described earlier in reference to the first embodiment are determined by factoring in the noise in the image. Namely, an image of a photographic scene with a large dynamic range with the ratio of the largest output value calculated by the highest brightness priority exposure calculation unit 107a and the white reference value calculated by the normal exposure calculation unit 107b being equal to or greater than a predetermined value, which is photographed under the exposure conditions determined based upon the largest output value alone, is sure to contain noticeable noise since the gradation in dark areas becomes exaggerated. Accordingly, the level of noise likely to occur in the image is estimated and the exposure conditions set for the photographing operation are controlled so as to ensure that the ratio of the largest output value and the white reference value does not take an excessively large value in the embodiment.

Figure 2:
Figure 4:
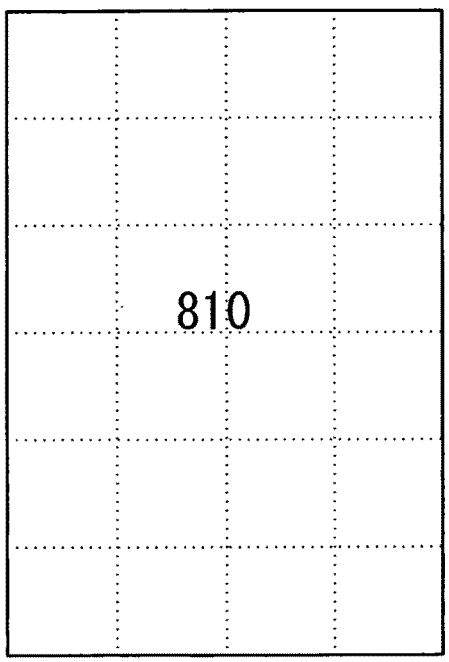
Figure 4:
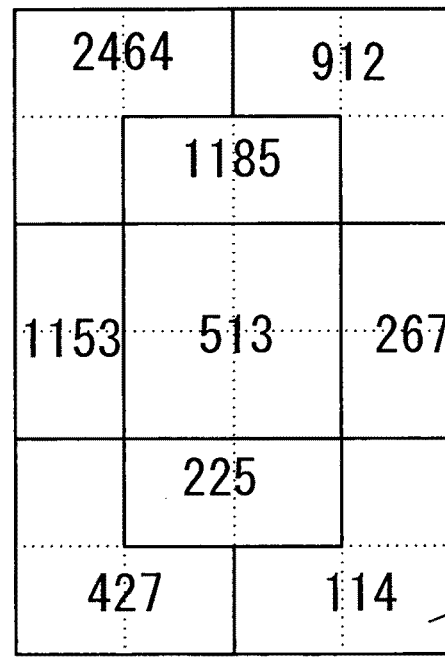
Figure 6:
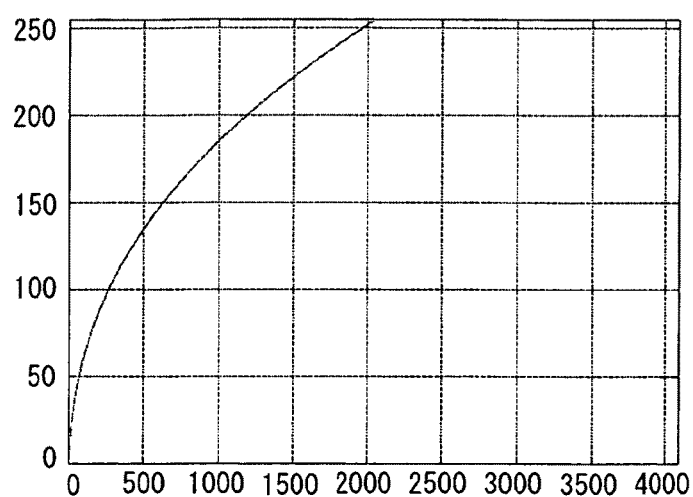
Figure 6:
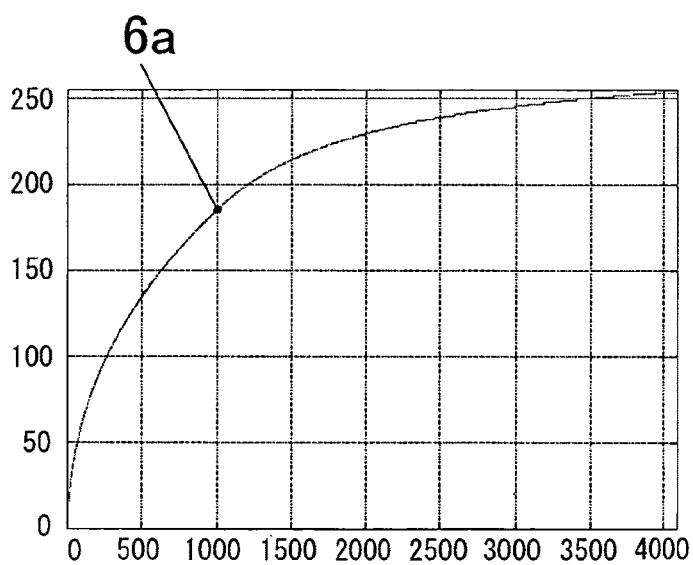
Figure 6:
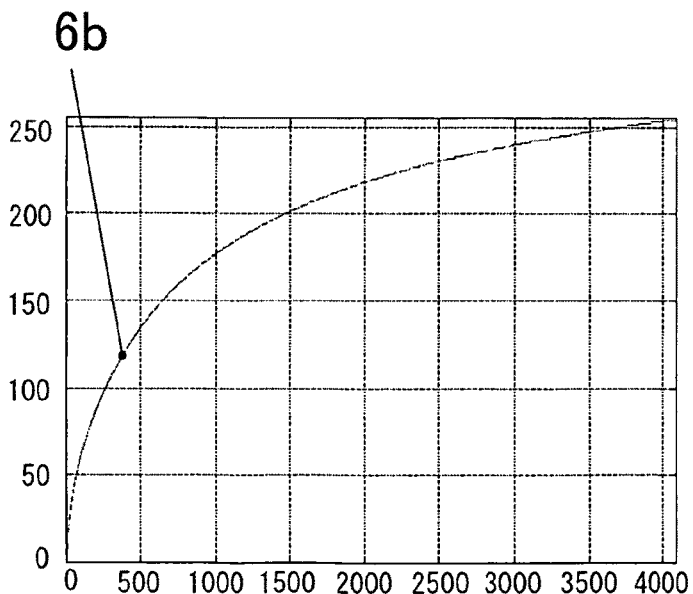
Figure 7:
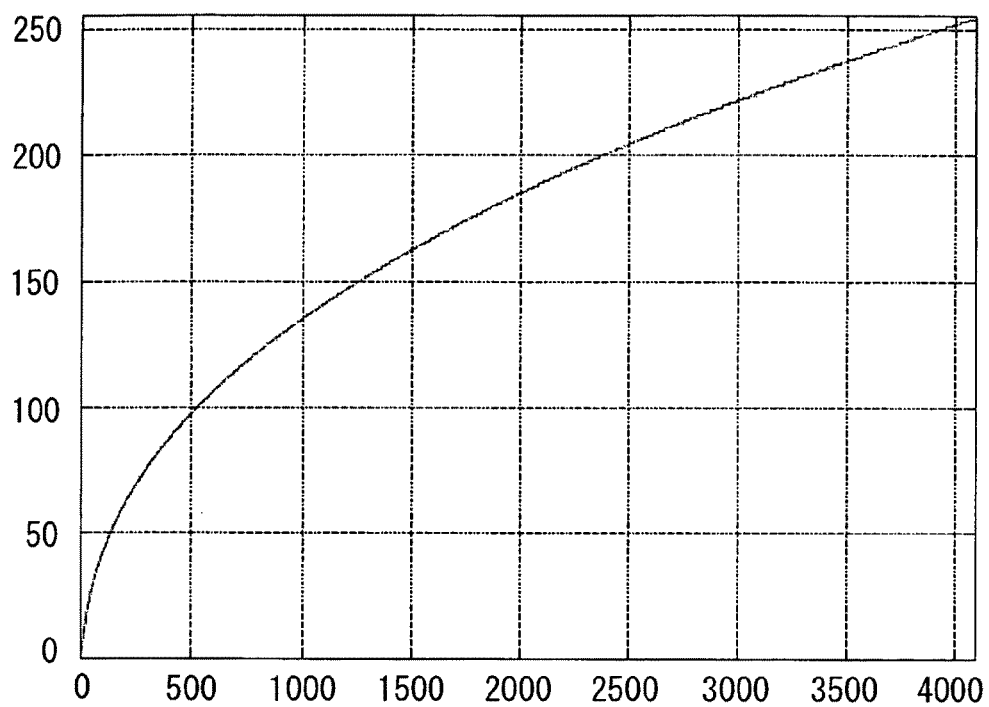
Figure 8:
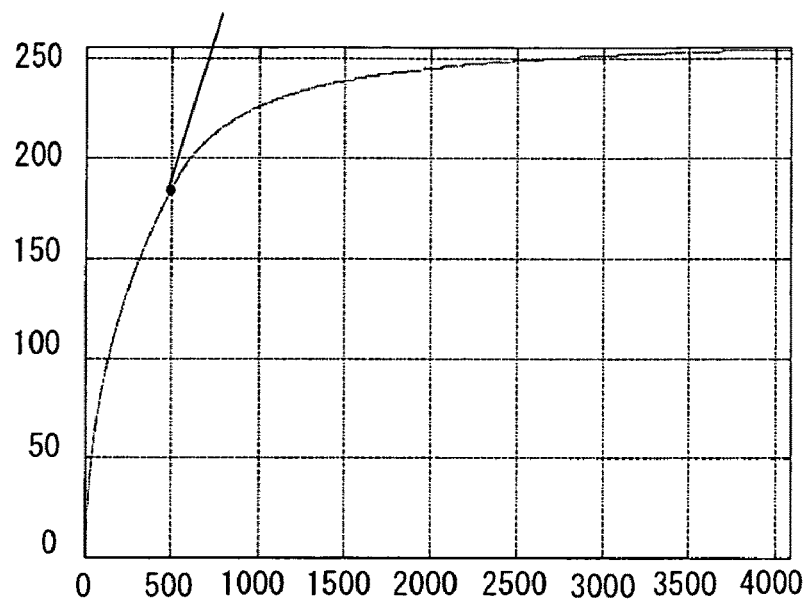
Figure 8:
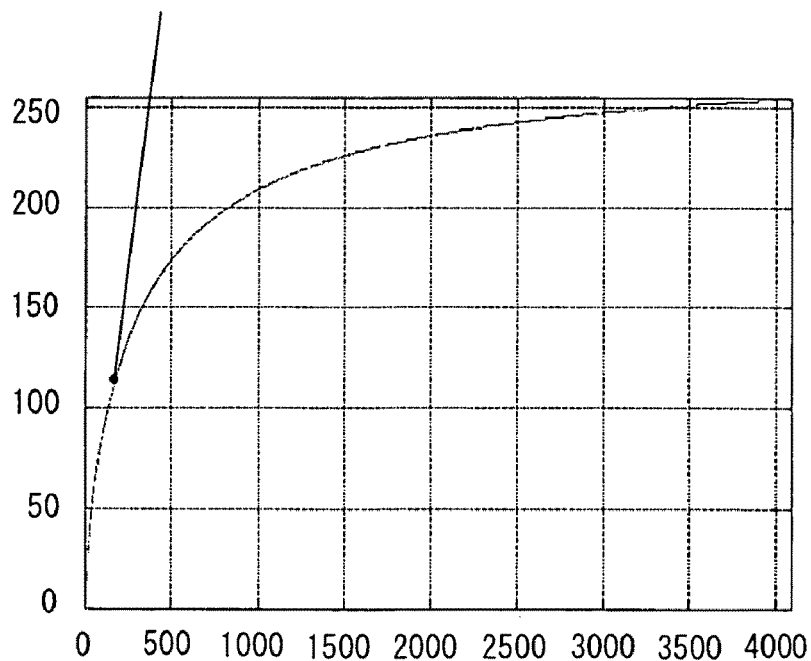

It is to be noted that the block diagram in FIG. 1, the photographic scene and the example of the output from the AE sensor 109 in FIG. 2, the calculation results provided by the normal exposure calculation unit 107b in FIG. 4, the block diagram of the image processing unit 115 in FIG. 5 and the specific examples of gradation conversion characteristics in FIGS. 6 through 8, in reference to which the first embodiment has been described, all apply to the second embodiment as well and that a repeated explanation is not provided in reference to them.

Figure 9:
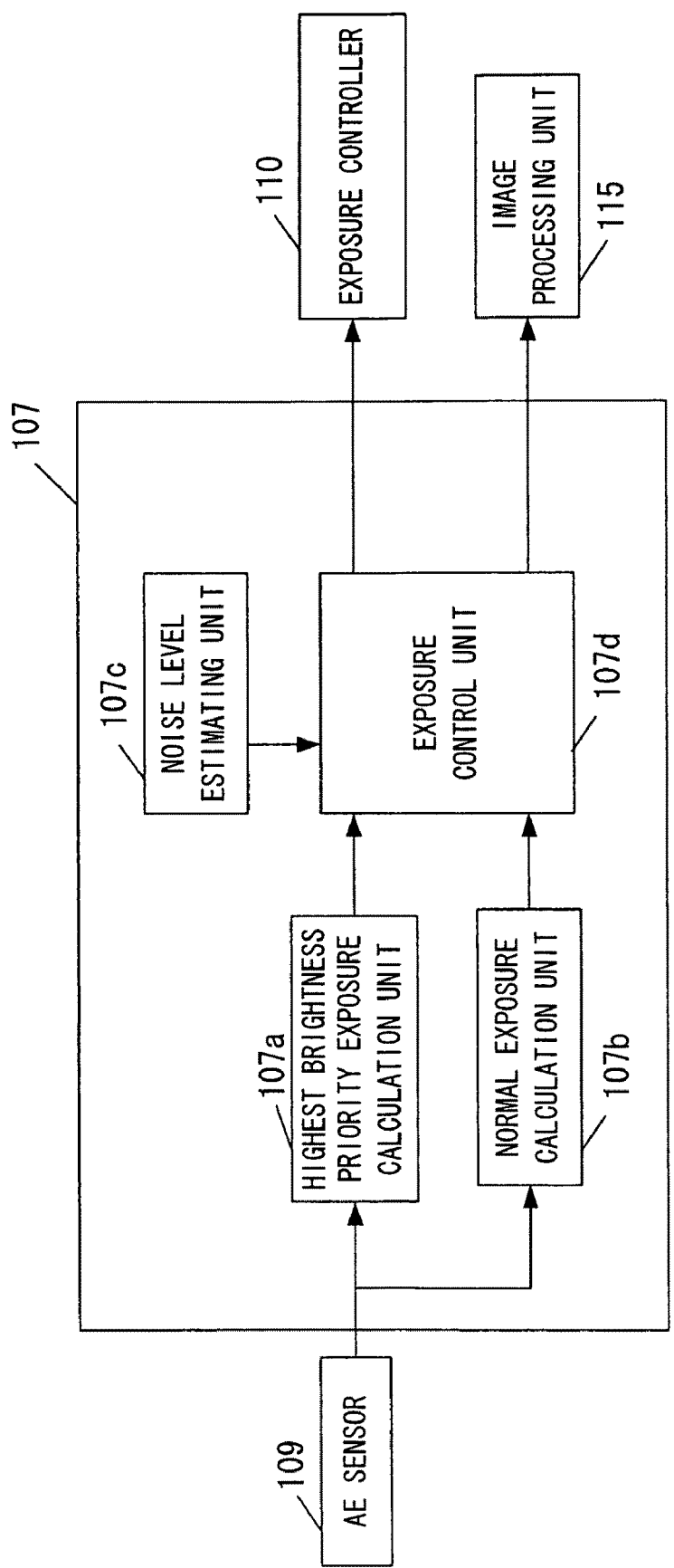
Figure 10:
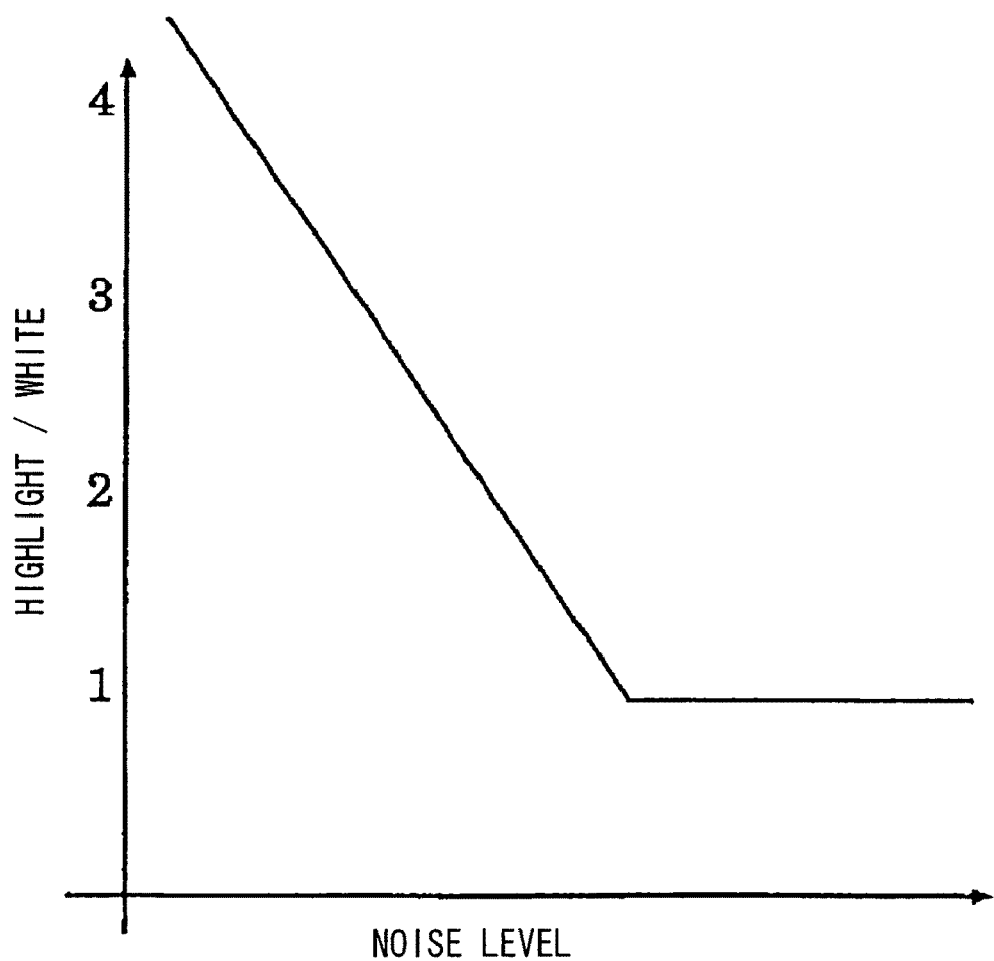

FIG. 9 is a block diagram showing the individual units engaged in the processing characterizing the second embodiment It is to be noted that the same reference numerals are assigned to units identical to those in the block diagram presented in FIG. 3 in reference to which the first embodiment has been described, and the following explanation focuses on the differences from the first embodiment. A noise level estimating unit 107c estimates the level of noise likely to occur in the image based upon random noise inherent to the digital camera 100, the ISO sensitivity setting and the like. The embodiment is described by assuming that the estimated noise level value has already been set and that the noise level estimating unit 107c outputs this estimated noise level value to an exposure control unit 107d.

The exposure control unit 107d controls the exposure conditions for the photographing operation based upon the largest output value input from the highest brightness priority exposure calculation unit 107a, the white reference value input from the normal exposure calculation unit 107b and the estimated noise level value input from the noise level estimating unit 107c so as to ensure that the ratio of the largest output value and the white reference value does not become unacceptably large. For instance, a specific relationship to be sustained between the ratio (highlight/white) of the largest output value and the white reference value, indicated along the vertical axis in FIG. 10, and the estimated noise level value (noise level), indicated along the horizontal line in FIG. 10, may be set in advance, and the exposure control unit then may ensure that the ratio of the largest output value and the white reference value does not exceed a predetermined value corresponding to the estimated noise level value input from the noise level estimating unit 107c.

The exposure control unit 107b then outputs the controlled exposure conditions for the photographing operation to the exposure controller 110 and outputs the white reference value input from the normal exposure calculation unit 107b to the image processing unit 115.

Figure 11:
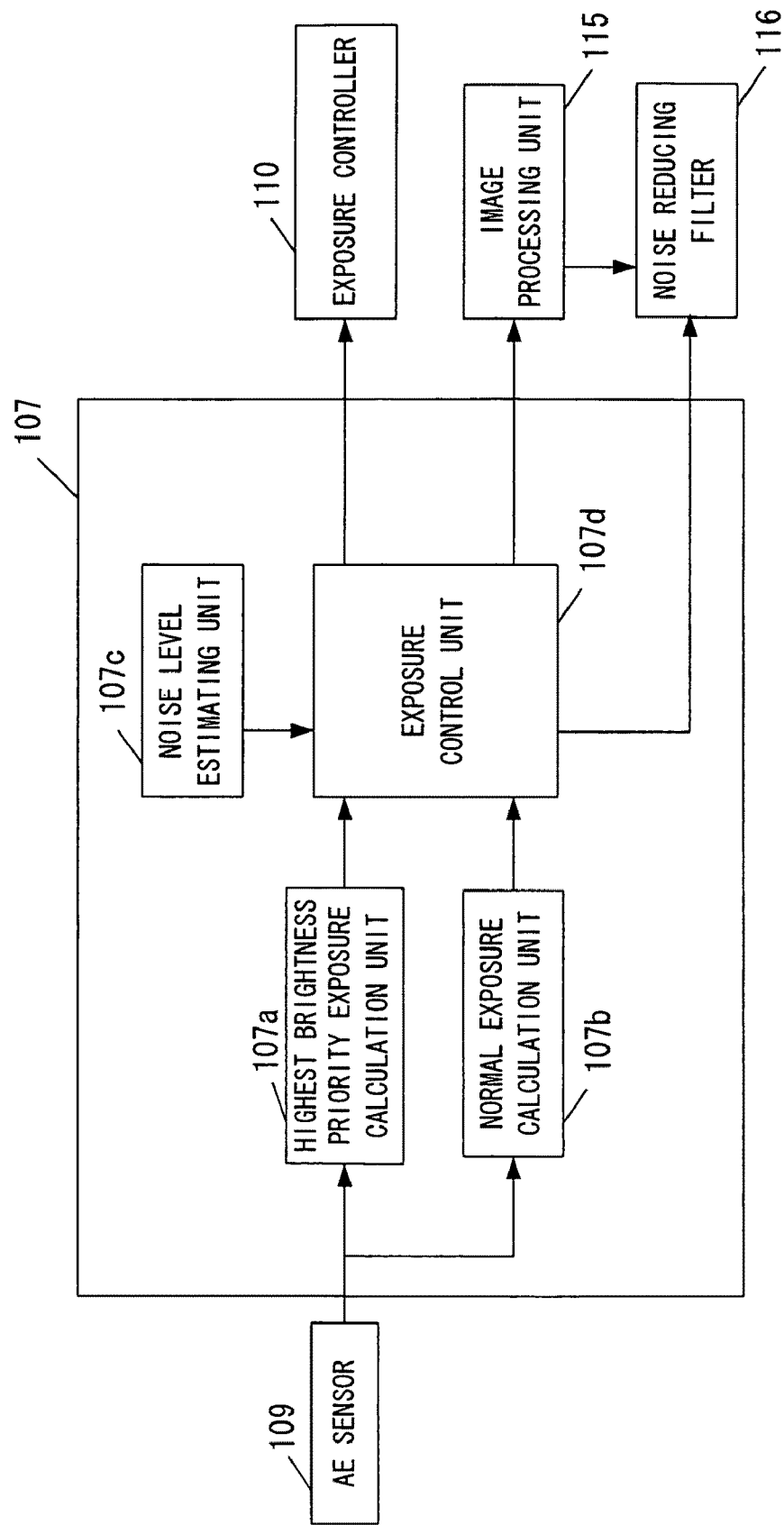

In the second embodiment described above, the exposure conditions under which the photographing operation is to be executed are controlled based upon the level of the noise in the image and, as a result, noise in the photographed image can be reduced. It is to be noted that if the exposure control unit 107d decides that the estimated noise level value input from the noise level estimating unit 107c is high, the image data having undergone image processing at the image processing unit 115 are output to a noise reducing filter unit 116, as shown in FIG. 11. The noise reducing filter unit 116, in turn, may reduce the noise in the image by applying a noise reducing filter corresponding to the estimated noise level.

Third Embodiment

As explained earlier in reference to the first embodiment, the exposure controller 110 controls the aperture 102 and the shutter 111 to set the optimal aperture value and the optimal shutter speed so as to achieve the exposure conditions determined by the highest brightness priority exposure calculation unit 107a. However, since the accuracy of the operation executed based upon these settings is mechanical accuracy, the actual operation may be executed under conditions not exactly matching those selected by the highest brightness priority exposure calculation unit 107a. Such a deviation tends to occur readily particularly when the shutter speed is high.

Accordingly, a decision is made in the embodiment as to whether or not actual exposure has been executed under the exposure conditions set by the exposure controller 110. Then, if there is a discrepancy between the exposure conditions set by the exposure controller 110 and the actual exposure state, the white reference value calculated by the normal exposure calculation unit 107b is corrected based upon the actual exposure state, thereby enabling the image processing unit 115 to execute image processing by taking into consideration the deviation from the exposure condition settings.

It is to be noted that the block diagram in FIG. 1, the photographic scene and the example of the output from the AE sensor 109 in FIG. 2, the calculation results provided by the normal exposure calculation unit 107b in FIG. 4, the block diagram of the image processing unit 115 in FIG. 5 and the specific examples of gradation conversion characteristics in FIGS. 6 through 8, in reference to which the first embodiment has been described, all apply to the third embodiment as well and that a repeated explanation is not provided in reference to them.

Figure 12:
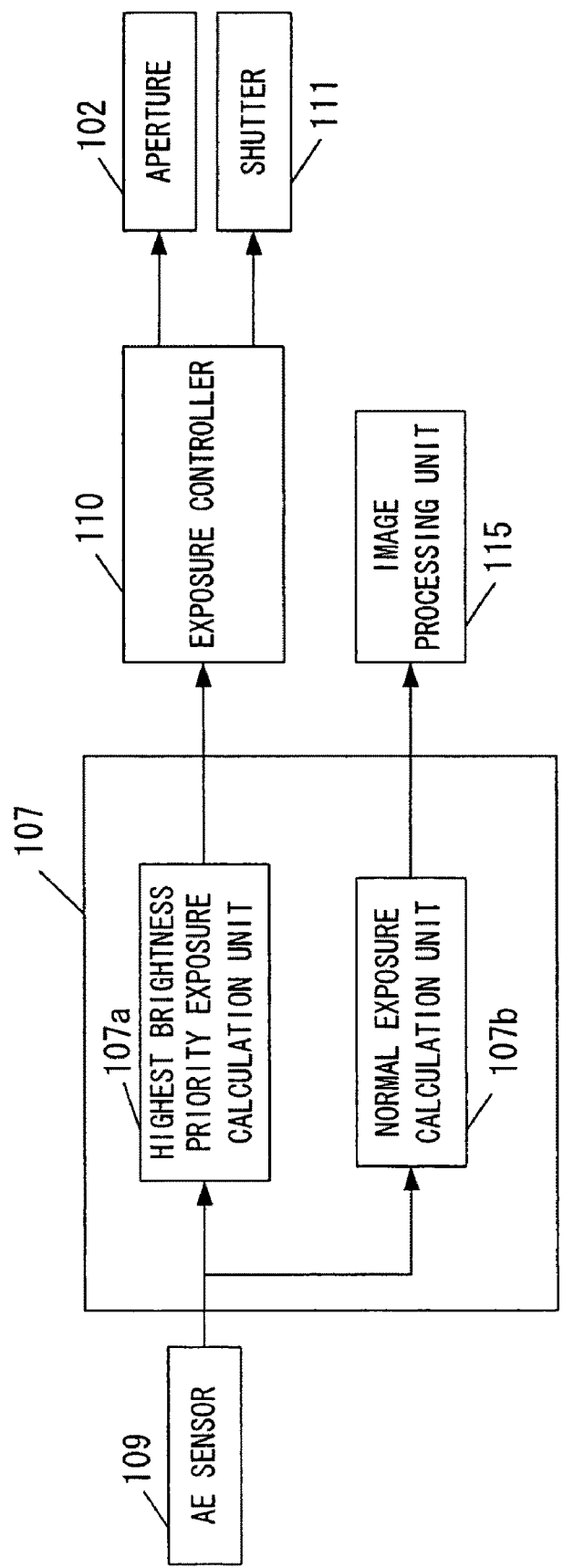

FIG. 12 is a block diagram showing the individual units engaged in the processing characterizing the third embodiment. It is to be noted that the same reference numerals are assigned to units identical to those in the block diagram presented in FIG. 3 in reference to which the first embodiment has been described, and the following explanation focuses on the differences from the first embodiment. The exposure controller 110 obtains from the aperture 102 and the shutter 111 information indicating the actual aperture value setting and shutter speed setting selected for the image photographing operation. It then outputs comparison information indicating the actual value settings thus ascertained and the exposure conditions having been determined by the highest brightness priority exposure calculation unit 107a, to the image processing unit 115.

The image processing unit 115 corrects the white reference value input from the normal exposure calculation unit 107b based upon the comparison information input from the exposure controller 110. For instance, if the comparison information indicates "aperture value: F 56 and shutter speed: 1/8000" as the exposure conditions having been determined by the highest brightness priority exposure calculation unit 107a and "aperture value: F 56 and shutter speed: 1/6000" as the actual settings, the actual shutter speed is so higher than the selected shutter speed as to be 133% of the selected shutter speed and, accordingly, the white reference value, too, is corrected to indicate a higher level 133% of brightness. Then, the gradation correction characteristics are selected based upon the corrected white reference value and the largest output value and gradation correction is executed based upon the gradation correction characteristics.

In the third embodiment described above, the white reference value calculated by the normal exposure calculation unit 107b is corrected based upon the actual exposure state if the exposure conditions selected by the exposure controller 110 and the actual exposure state do not match. As a result, the image processing unit 115 is able to execute image processing on the image data by taking into consideration any deviation from the value settings selected as the exposure conditions.

Fourth Embodiment

In the fourth embodiment adopted in a digital camera 100, allowing the user to set an exposure correction value for the photographing operation, the normal exposure calculation unit 107b adjusts the white reference value by taking into consideration the exposure correction value set by the user. It is to be noted that the block diagram in FIG. 1, the photographic scene and the example of the output from the AE sensor 109 in FIG. 2, the calculation results provided by the normal exposure calculation unit 107b in FIG. 4, the block diagram of the image processing unit 115 in FIG. 5 and the specific examples of gradation conversion characteristics in FIGS. 6 through 8, in reference to which the first embodiment has been described, all apply to the fourth embodiment as well and that a repeated explanation is not provided in reference to them.

Figure 13:
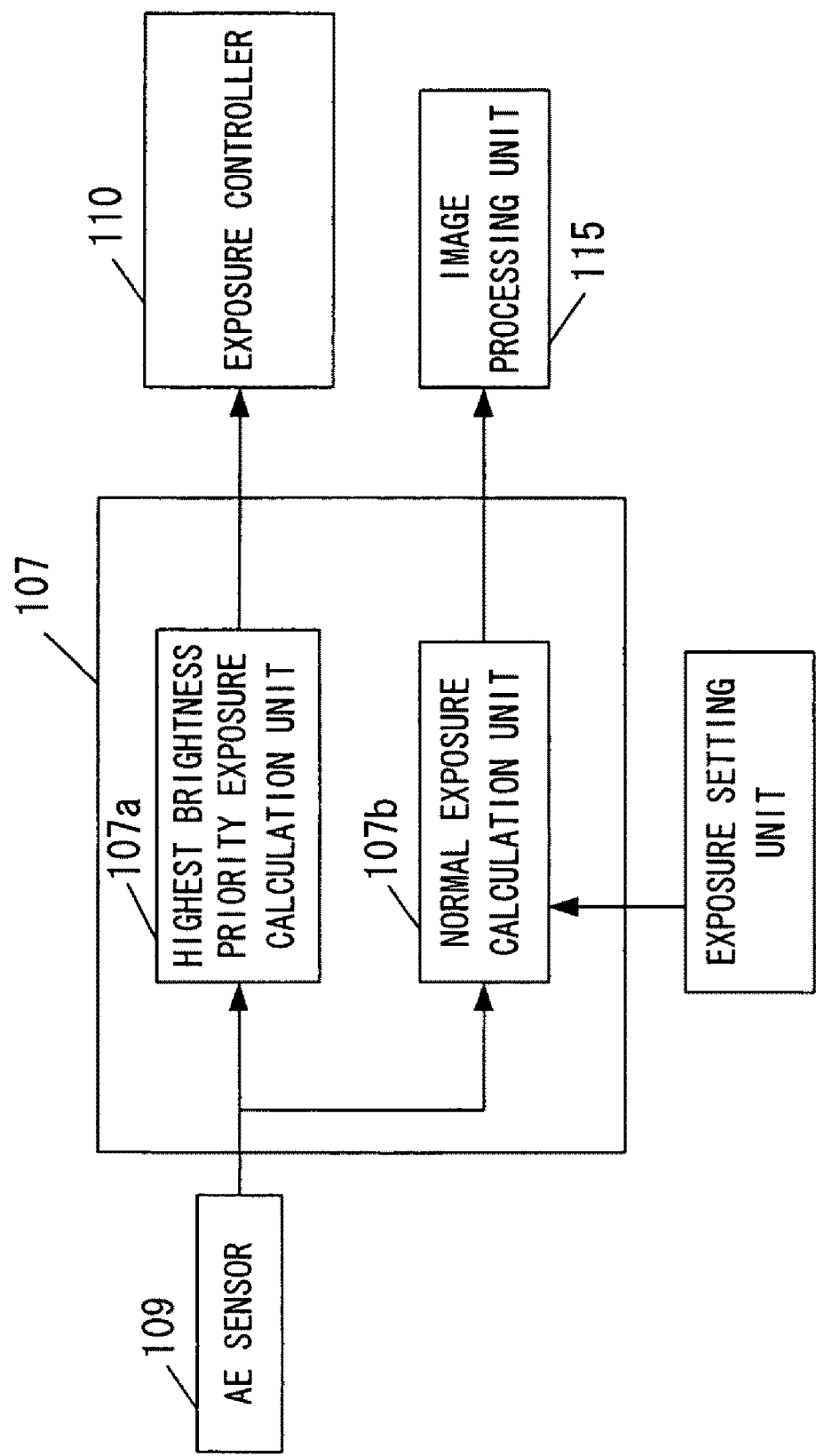

FIG. 13 is a block diagram showing the individual units engaged in the processing characterizing the fourth embodiment. It is to be noted that the same reference numerals are assigned to units identical to those in the block diagram presented in FIG. 3 in reference to which the first embodiment has been described, and the following explanation focuses on the differences from the first embodiment. The digital camera 100 further includes an exposure setting unit 117 used as an input member via which the user is able to set the exposure correction value. The normal exposure calculation unit 107b corrects the white reference value having been calculated as explained earlier, in correspondence to the exposure correction value input via the exposure setting unit 117.

For instance, if the user sets an exposure correction value indicating a level lower by one stop, the normal exposure calculation unit 107b doubles the calculated white reference value. If, on the other hand, the user sets an exposure correction value indicating a level higher by one stop, the normal exposure calculation unit 107b reduces the calculated white reference value by 50%. The normal exposure calculation unit 107b then outputs the corrected white reference value to the image processing unit 115. Based upon the corrected white reference value and the largest output value, the optimal gradation correction characteristics are selected and gradation correction is then executed based upon the selected gradation correction characteristics.

The fourth embodiment described above allows image processing to be executed based upon a white reference value corrected in correspondence to an exposure correction value set by the user and, as a result, an image benefiting from the exposure correction value having been set can be obtained without having to alter the photographing conditions for the photographing operation.

Fifth Embodiment

The digital camera 100 in the fifth embodiment includes an ISO sensitivity setting unit via which the user is able to set an ISO sensitivity level (photographic sensitivity) for the photographing operation. It is to be noted that the block diagram in FIG. 1, the photographic scene and the example of the output from the AE sensor 109 in FIG. 2, the calculation results provided by the normal exposure calculation unit 107b in FIG. 4, the block diagram of the image processing unit 115 in FIG. 5 and the specific examples of gradation conversion characteristics in FIGS. 6 through 8, in reference to which the first embodiment has been described, all apply to the fifth embodiment as well and that a repeated explanation is not provided in reference to them.

Figure 14:
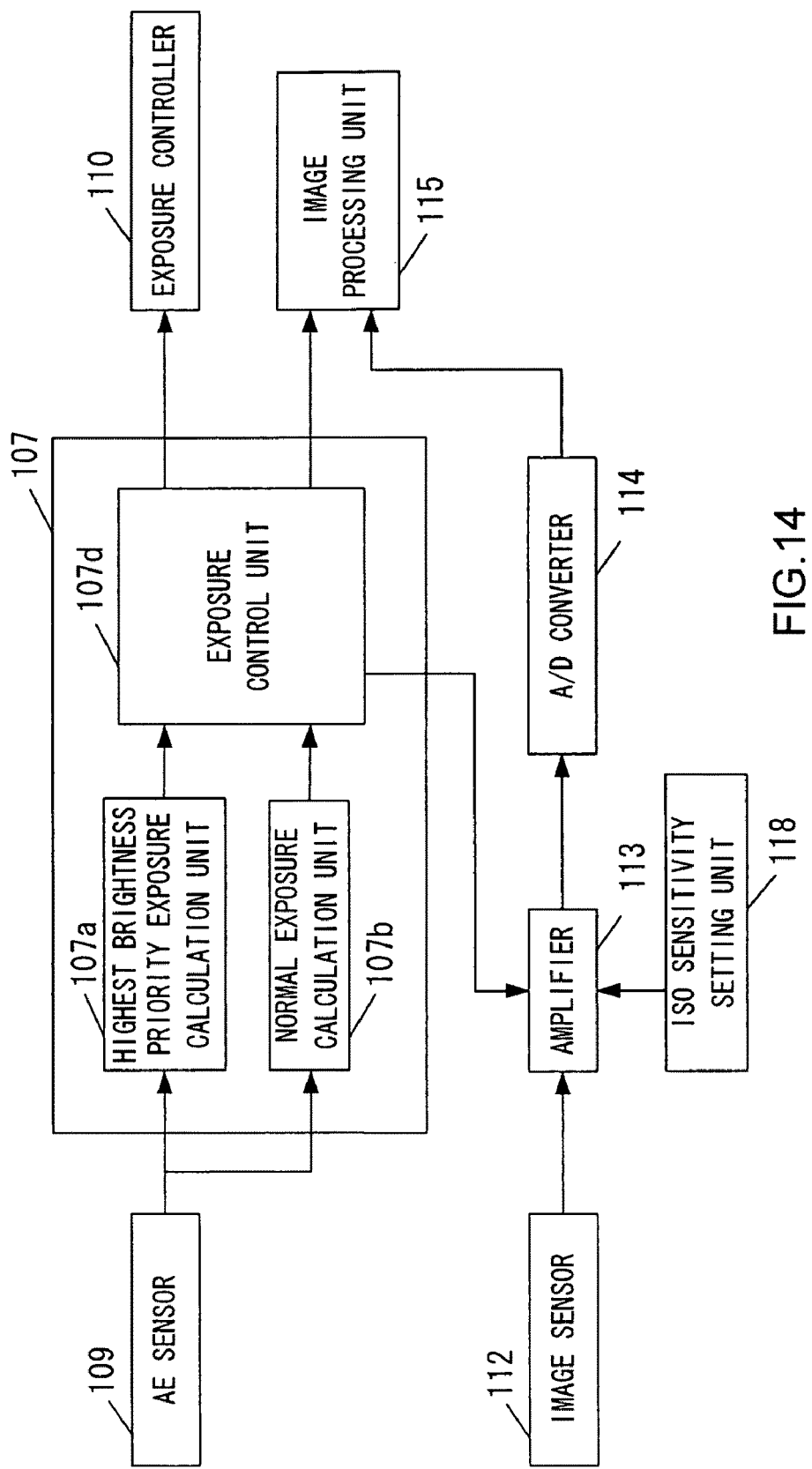

FIG. 14 is a block diagram showing the individual units engaged in the processing characterizing the fifth embodiment. It is to be noted that the same reference numerals are assigned to units identical to those in the block diagram presented in FIG. 3 in reference to which the first embodiment has been described, and the following explanation focuses on the differences from the first embodiment. The digital camera 100 includes the ISO sensitivity setting unit 118 described earlier and the ISO sensitivity setting selected by the user is input to the amplifier 113.

If a specific ISO sensitivity setting is selected by the user, the amplifier 113 amplifies the output from the image sensor 112 in correspondence to the ISO sensitivity setting. Subsequently, the image data resulting from the A/D conversion at the A/D converter 114 are input to the image processing unit 115. In this situation, if the exposure conditions for a photographic scene with a significant dynamic range are determined by the highest brightness priority exposure calculation unit 107a, the amount of light received at the image sensor 112 becomes smaller than that received at an image sensor adopting an exposure setting method in the related art. Under these circumstances, an image obtained via the image processing unit 115 where the image data input thereto have undergone gradation correction based upon the white reference value calculated by the normal exposure calculation unit 107b is bound to contain noticeable noise.

Accordingly, an exposure control unit 107d determines the dynamic range of the scene based upon the ratio of the largest output value output from the highest brightness priority exposure calculation unit 107a and the white reference value output from the normal exposure calculation unit 107b. Then, if the dynamic range is determined to be significant, the exposure control unit 107d lowers the amplification factor at the amplifier 113 and lowers the noise level by controlling the exposure controller 110 so as to raise the exposure quantity correspondingly.

An example in which the ISO sensitivity is set at 200, the largest output value output from the highest brightness priority exposure calculation unit 107a is 3000, the aperture value F5.6 and the shutter speed 1/800 are determined as the exposure conditions in correspondence and the white reference value is calculated by the normal exposure calculation unit 107b to be 2000, as in the first embodiment, is now examined. In this situation, the shutter speed is changed to 1/400 and the amplification factor at the amplifier 113 is lowered by 50% in the embodiment. Through these measures, more light can be utilized so as to lower the noise level without having to alter the pixel values to be output.

It is to be noted that as in the first embodiment, the image data that include the sensitivity setting data indicating that sensitivity setting selected for the photographing operation, appended to the photographic image, can be recorded into the memory 116 in the embodiment. In this case, the amplification factor setting selected at the amplifier 113 and the sensitivity setting data corresponding to the white reference value should be appended to the photographic image. For instance, assuming that the sensitivity setting data indicate 200 when the white reference value is 4000 at a given amplification factor setting, the amplification factor should be reduced by 50% if the white reference value calculated in correspondence to the particular amplification factor is 2000 so that the white reference value of 2000 and the sensitivity setting data indicate a value of 200 are recorded.

Sixth Embodiment

In reference to the sixth embodiment, processing executed by utilizing an AE sensor 109 constituted with an RGB AE sensor capable of measuring the intensity of the individual color components R, G and B, representing an example of an AE sensor 109 assuming a plurality of sets of different spectral sensitivity characteristics, is described. It is to be noted that the block diagram in FIG. 1, the photographic scene and the example of the output from the AE sensor 109 in FIG. 2, the calculation results provided by the normal exposure calculation unit 107b in FIG. 4, the block diagram of the image processing unit 115 in FIG. 5 and the specific examples of gradation conversion characteristics in FIGS. 6 through 8, in reference to which the first embodiment has been described, all apply to the sixth embodiment as well and that a repeated explanation is not provided in reference to them.

Figure 15:
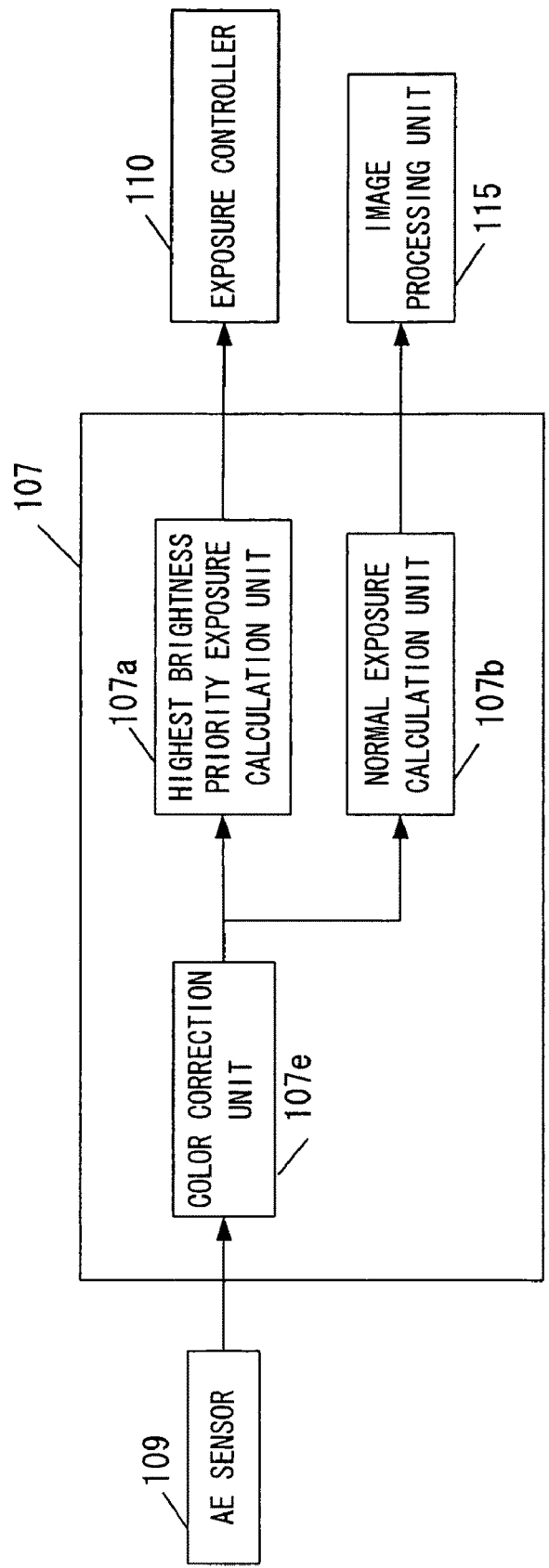

FIG. 15 is a block diagram showing the individual units engaged in the processing characterizing the sixth embodiment. It is to be noted that the same reference numerals are assigned to units identical to those in the block diagram presented in FIG. 3 in reference to which the first embodiment has been described, and the following explanation focuses on the differences from the first embodiment. As explained earlier, the digital camera 100 includes an RGB AE sensor 109 and the measurement values are output from the RGB AE sensor 109 to a color correction unit 107e in the CPU 107.

Via such an RGB AE sensor 109, the output values (intensity levels) detected in the individual areas, as shown in FIG. 2(b) in reference to which the first embodiment has been explained, can be collected in correspondence to each of the R, G and B colors, as shown in FIG. 16. Based upon the output values corresponding to the individual color components, the largest output values each representing a specific color can be evaluated. For instance, the output value (2960) from an area 16a, representing a B color intensity level, is the largest value in the example presented in FIG. 17 and accordingly, the highest brightness priority exposure calculation unit 107a determines the exposure conditions in reference to this value.

Since the spectral sensitivity of the RGB AE sensor 109 and the spectral sensitivity of the image sensor 112 may not match, the R, G and B values output from the RGB AE sensor 109 may have to be corrected in order to equalize the output values from the two sensors. Accordingly, the color correction unit 107e calculates R, G and B values ($R_1$, $G_1$, $B_1$) having undergone spectral sensitivity correction, by applying a 3×3 matrix to the R, G and B values ($R_0$, $G_0$, $B_0$) input from the RGB AE sensor 109 as expressed in (2). It is to be noted that the values assumed in the matrix in expression (2) should be determined by adopting a color correction method of the known art.

The highest brightness priority exposure calculation unit 107a then extracts the largest output value based upon the R, G and B values ($R_1$, $G_1$, $B_1$) resulting from the spectral sensitivity correction and determines the exposure conditions in reference to the extracted largest output value.

By checking the output values corresponding to the individual color components R, G and B via the RGB AE sensor 109 when determining the largest output value as described above, a reproduction with smooth gradation is enabled without inducing any signal saturation even in the case of a photographic scene in which the intensity of a specific color component is noticeably high. In addition, even when the spectral sensitivity of the RGB AE sensor 109 and the spectral sensitivity of the image sensor 112 do not match, the largest output value can be ascertained accurately by correcting the characteristics of the RGB AE sensor 109.

It is to be noted that while the photometering operation may be executed by the image sensor 112 instead of the AE sensor 109, the photometering operation must be executed by reading out signals prior to the main photographing operation under such circumstances. In such a case, the length of time required for the signal read can be reduced by reading out signals through discriminative read or through mixed pixel read. If the photometering is executed by the image sensor 112, the need to factor in any discrepancy in the spectral sensitivity is eliminated, and accordingly, the color correction unit 107e does not need to execute any correction processing.

Seventh Embodiment

In the seventh embodiment, gradation correction is executed for each of the areas based upon the output values corresponding to the individual areas shown in FIG. 2(b). It is to be noted that the block diagram in FIG. 1, the photographic scene and the example of the output from the AE sensor 109 in FIG. 2, the calculation results provided by the normal exposure calculation unit 107b in FIG. 4, and the specific examples of gradation conversion characteristics in FIGS. 6 through 8, in reference to which the first embodiment has been described, all apply to the seventh embodiment as well and that a repeated explanation is not provided in reference to them.

Figure 17:
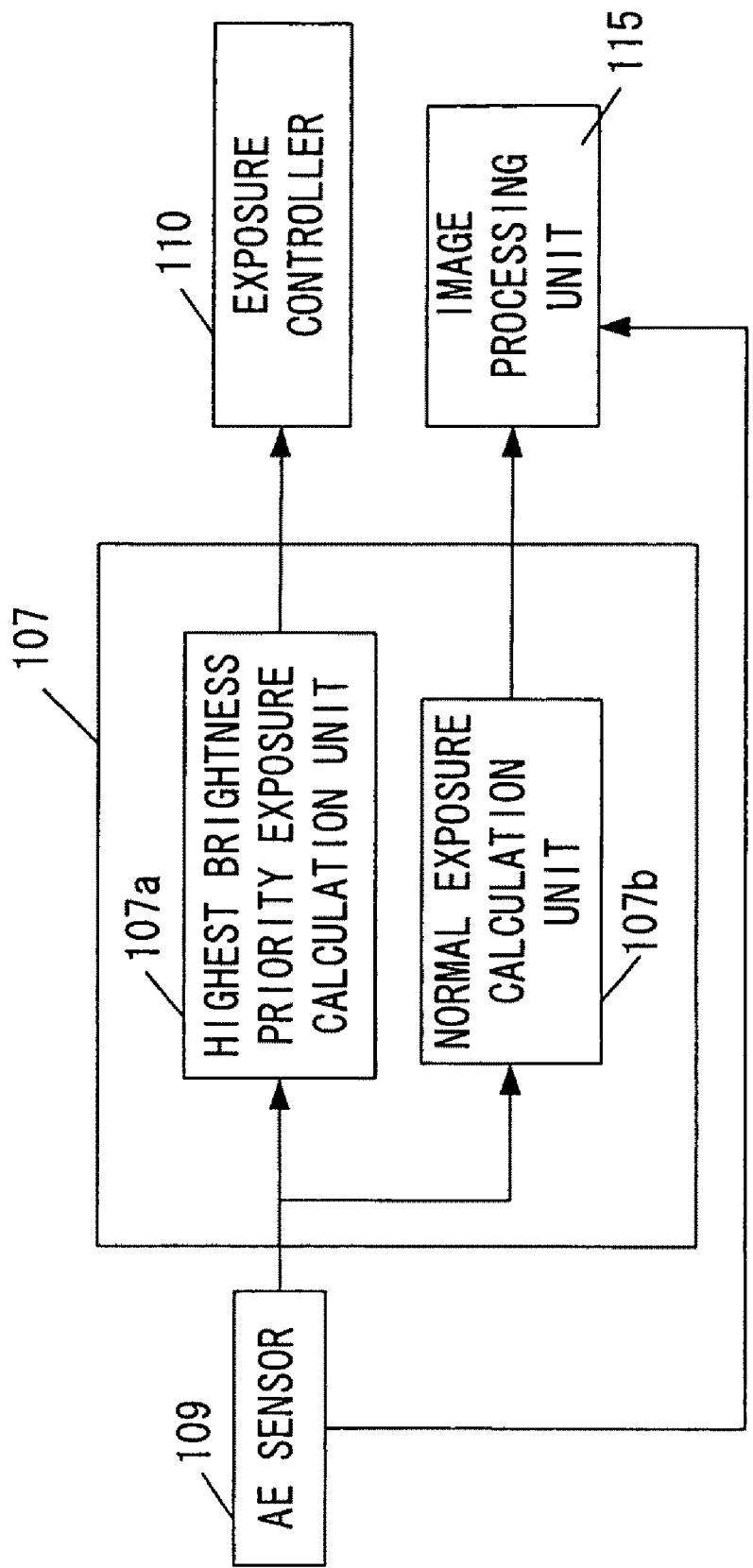

FIG. 17 is a block diagram showing the individual units engaged in the processing characterizing the seventh embodiment. It is to be noted that the same reference numerals are assigned to units identical to those in the block diagram presented in FIG. 3 in reference to which the first embodiment has been described, and the following explanation focuses on the differences from the first embodiment. In the embodiment, the measurement values provided by the AE sensor 109 are also output to the image processing unit 115.

Figure 18:
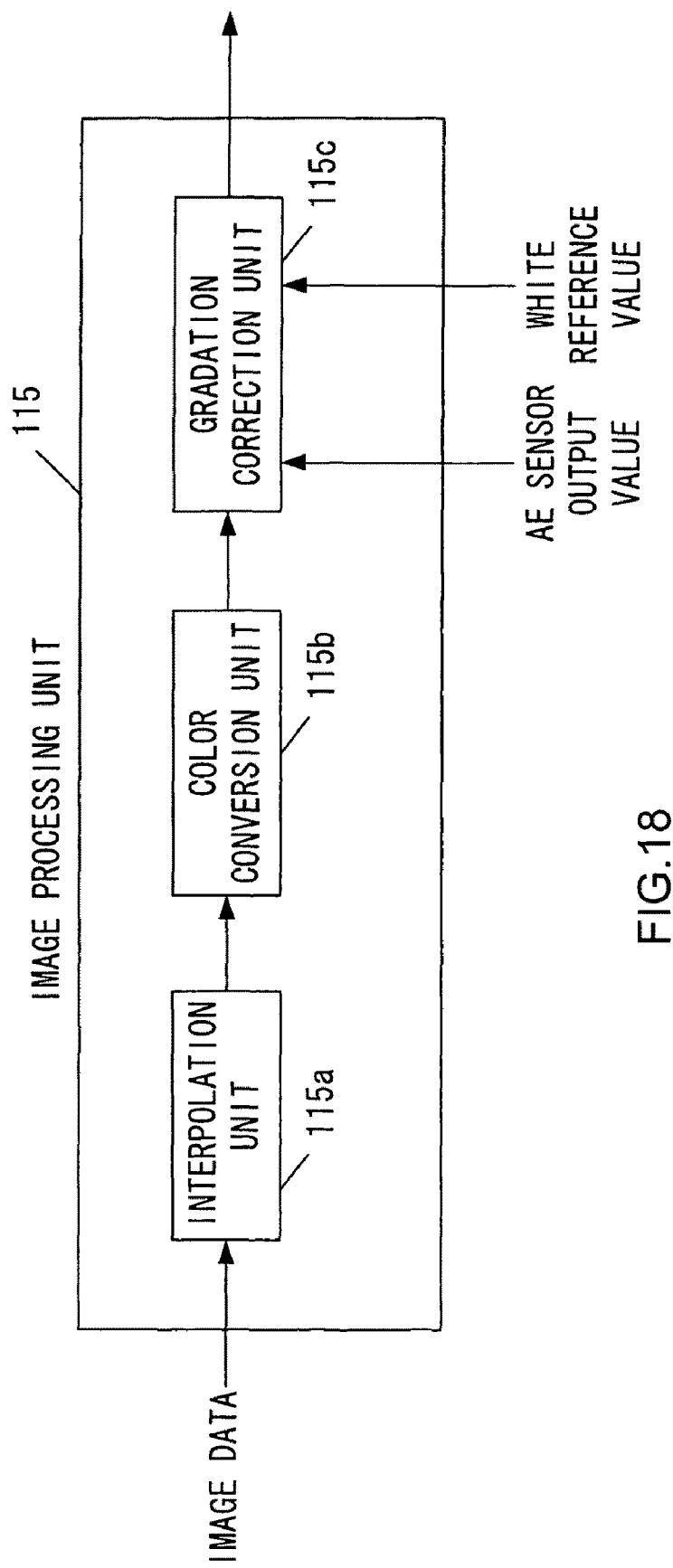

FIG. 18 is a block diagram showing the functional blocks of the processing executed by the image processing unit 115 in the seventh embodiment. It is to be noted that the same reference numerals are assigned to elements identical to those in the block diagram in FIG. 5, in reference to which the first embodiment has been described and the following explanation focuses on the differences. As shown in FIG. 18, the output values from the AE sensor 109 are input to the gradation correction unit 115c.

The gradation correction unit 115c adjusts the gradation conversion characteristics to be applied in conjunction with each area based upon the output values corresponding to the individual areas input from the AE sensor 109, so as to convert the gradation to lighten a dark area and convert the gradation to darken a bright area. The following explanation is given in reference to an example in which the input image data are 12-bit image data and the white reference value calculated by the normal exposure calculation unit 107b is 2000.

In this case, the gradation correction unit 115c executes gradation conversion for an area judged to be a dark area based upon the corresponding value input from the AE-sensor 109 by using regular sRGB gradation conversion characteristics such as those shown in FIG. 6(a). However, it executes gradation conversion for an area judged to be a light area based upon corresponding value input from the AE sensor 109 by sRGB gradation conversion characteristics assuming knee characteristics such as those shown in FIG. 6(b). As a result, gradation characteristics assuring good highlight reproducibility are assumed in the bright area in the photographic image while regular gradation characteristics are assumed in the dark area. Ultimately, even better gradation reproduction is achieved for the entire image.

In addition, when selecting a specific set of gradation conversion characteristics among a plurality of sets of gradation conversion characteristics in correspondence to each area, a curved plane approximating the brightness distribution in each area may be determined and gradation conversion may be executed by using a weighted average of the plurality of sets of gradation conversion characteristics in correspondence to the values assumed at the curved plane, so as to smooth the characteristics. For instance, a curved plane defined as in (3) below may be determined through the method of least squares.

(3)

Eighth Embodiment

In reference to the eighth embodiment, processing executed in a digital camera 100 equipped with a flash unit to determine the aperture value, the shutter speed and the flash output, i.e., the quantity of light to be emitted from the flash unit, for a flash photographing operation in correspondence to the output from the AE sensor 109 is described. It is to be noted that the block diagram in FIG. 1, the photographic scene and the example of the output from the AE sensor 109 in FIG. 2, the calculation results provided by the normal exposure calculation unit 107b in FIG. 4, the block diagram of the image processing unit 115 in FIG. 5 and the specific examples of gradation conversion characteristics in FIGS. 6 through 8, in reference to which the first embodiment has been described, all apply to the eighth embodiment as well and that a repeated explanation is not provided in reference to them.

Figure 19:
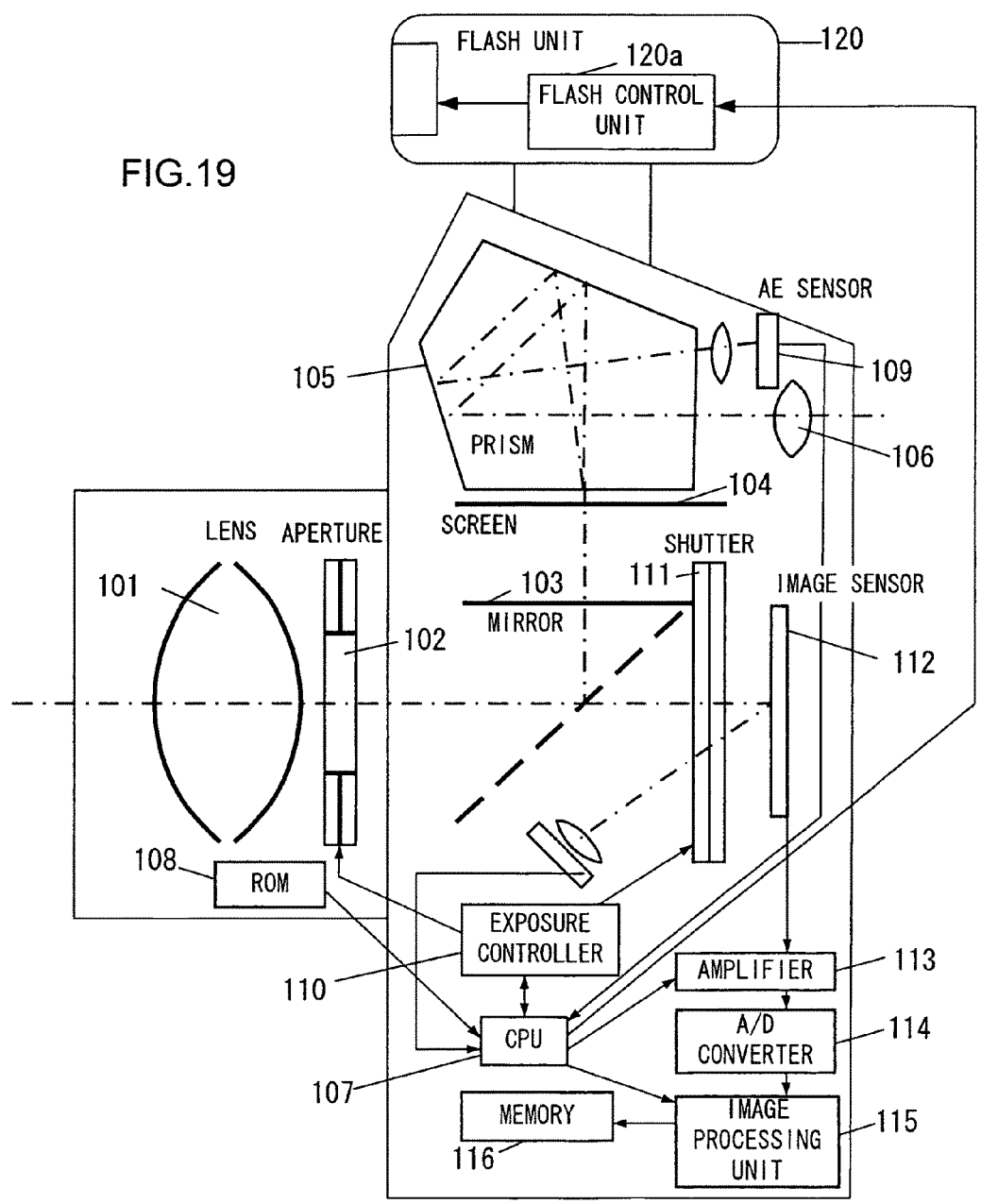

FIG. 19 is a block diagram showing the structure adopted in the digital camera 100 achieved in the eighth embodiment. In FIG. 19, the same reference numerals are assigned to components identical to those in FIG. 1 in reference to which the first embodiment has been described, and the following explanation focuses on the differences. The digital camera 100 further comprises a flash unit 120 which is controlled by a flash control unit 120a.

Figure 20:
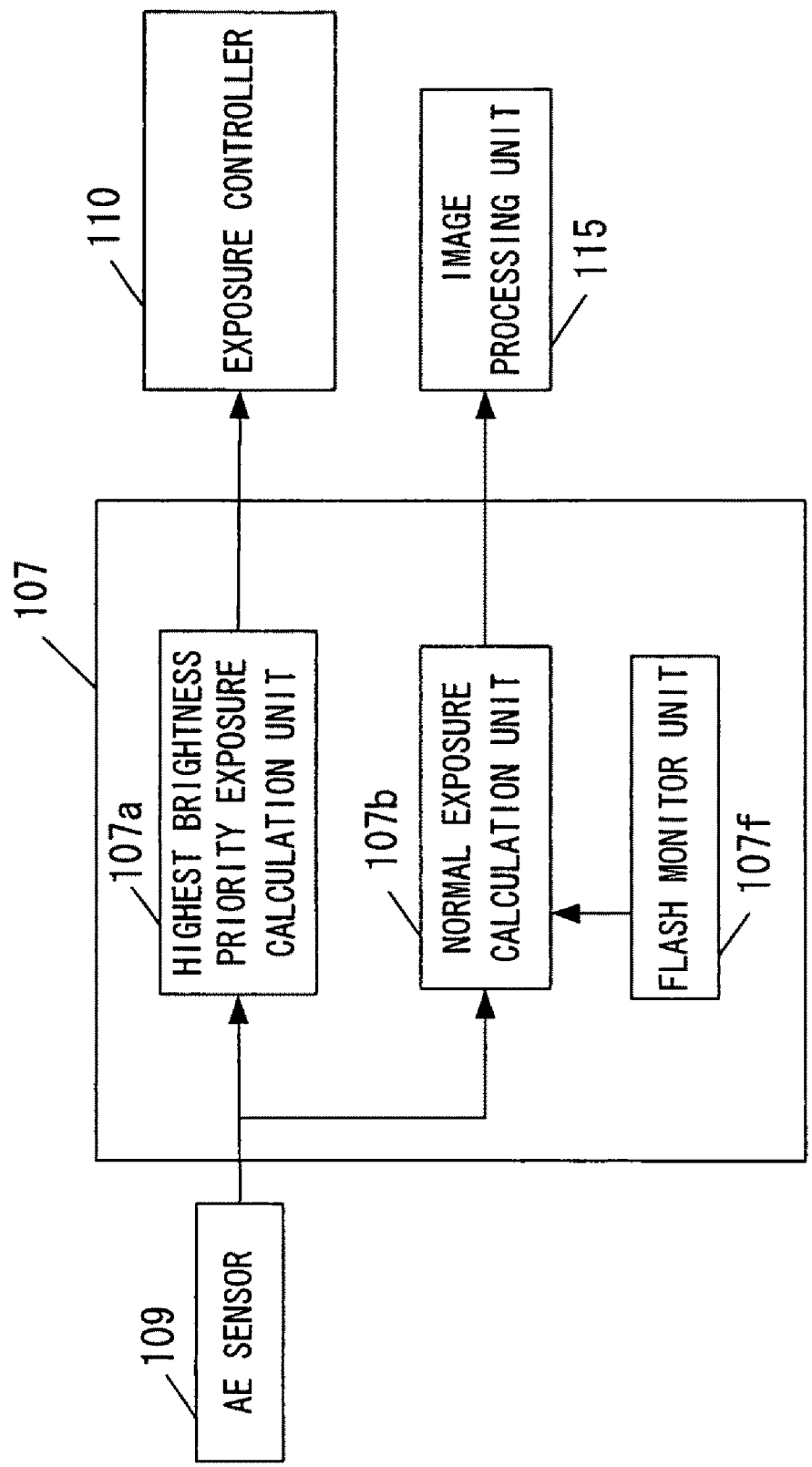

FIG. 20 is a block diagram showing the individual units engaged in the processing characterizing the eighth embodiment. It is to be noted that the same reference numerals are assigned to units identical to those in the block diagram presented in FIG. 3 in reference to which the first embodiment has been described, and the following explanation focuses on the differences from the first embodiment. The CPU 107 includes a flash monitor unit 107f.

The flash monitor unit 107f monitors the quantity of light emitted from the flash unit 120 during a flash photographing operation and stops the light emission by sending a flash stop signal to the flash control unit 120a once the light emission quantity reaches a predetermined level. The flash monitor unit 107f also outputs information related to the flash output for the flash photographing operation to the normal exposure calculation unit 107b. The normal exposure calculation unit 107b corrects the white reference value by factoring in the flash output that has been input from the flash monitor unit 107 and outputs the corrected white reference value to the image processing unit 115. The optimal gradation correction characteristic are then determined based upon the corrected white reference value and the largest output value and gradation correction is executed.

Thus, following the flash photographing operation, the gradation correction unit 105c is able to execute the gradation correction based upon the white reference value corrected by taking into consideration the quantity of light emitted from the flash unit 120. In other words, gradation of the image data can be corrected through gradation correction processing even better suited to the particular photographic scene.

Ninth Embodiment

In reference to the ninth embodiment, processing executed in a digital camera 100 with a face detection function for detecting an image area corresponding to a person's face in the photographed image to correct the white reference value based upon the brightness of the area corresponding to the person's face is described. It is to be noted that the block diagram in FIG. 1, the photographic scene and the example of the output from the AE sensor 109 in FIG. 2, the calculation results provided by the normal exposure calculation unit 107b in FIG. 4, the block diagram of the image processing unit 115 in FIG. 5 and the specific examples of gradation conversion characteristics in FIGS. 6 through 8, in reference to which the first embodiment has been described, all apply to the ninth embodiment as well and that a repeated explanation is not provided in reference to them.

Figure 21:
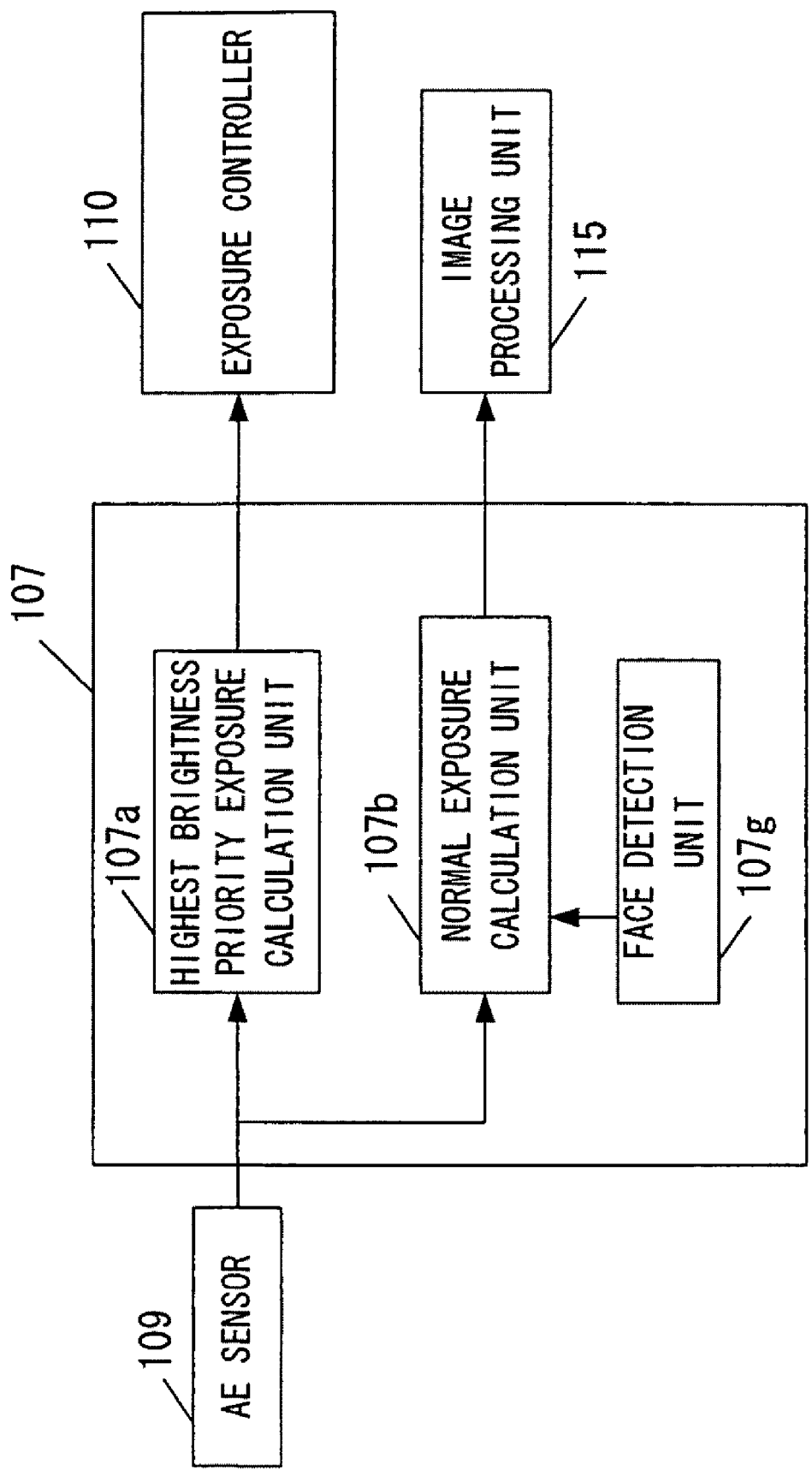

FIG. 21 is a block diagram showing the individual units engaged in the processing characterizing the ninth embodiment. It is to be noted that the same reference numerals are assigned to units identical to those in the block diagram presented in FIG. 3 in reference to which the first embodiment has been described, and the following explanation focuses on the differences from the first embodiment. The CPU 107 includes a face detection unit 107g that executes face detection processing. The face detection unit 107g detects an image area corresponding to a person's face in the image, as described above, and outputs data indicating the area to the normal exposure calculation unit 107b.

The normal exposure calculation unit 107b corrects the calculated white reference value based upon the brightness of the area corresponding to the person's face. It may correct the white reference value so that it assumes a value, for instance, 1.5 times the brightness of the area corresponding to the person's face. The color of the person's face in the image is skin color and if the value of skin color is multiplied by approximately 1.5, the result is white. Accordingly, the white reference value can be corrected to a value optimal for the image through these measures.

Tenth Embodiment

In the tenth embodiment described below, the largest output value calculated by the highest brightness priority exposure calculation unit 107a and the white reference value calculated by the normal exposure calculation unit 107b are compared and the optimal image processing to be executed on the image data is selected based upon the comparison results. It is to be noted that the block diagram in FIG. 1, the photographic scene and the example of the output from the AE sensor 109 in FIG. 2, the calculation results provided by the normal exposure calculation unit 107b in FIG. 4, the block diagram of the image processing unit 115 in FIG. 5 and the specific examples of gradation conversion characteristics in FIGS. 6 through 8, in reference to which the first embodiment has been described, all apply to the tenth embodiment as well and that a repeated explanation is not provided in reference to them.

Figure 22:
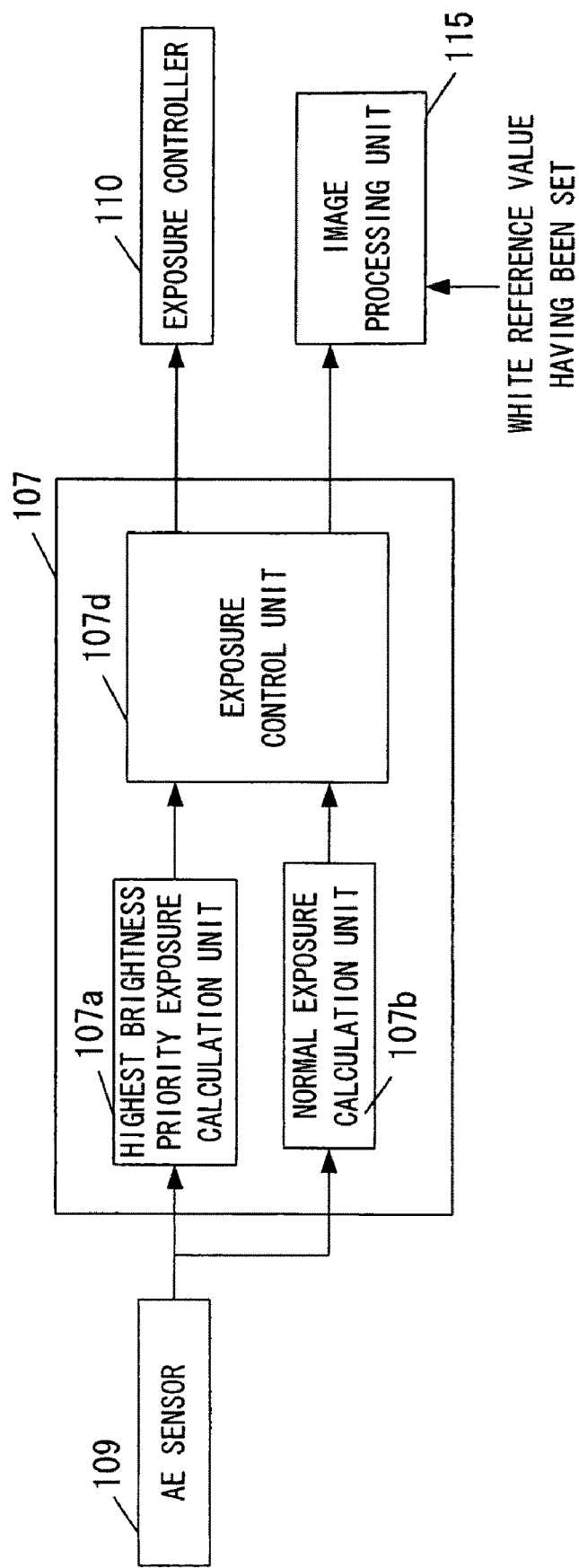

FIG. 22 is a block diagram showing the individual units engaged in the processing characterizing the tenth embodiment. It is to be noted that the same reference numerals are assigned to units identical to those in the block diagram presented in FIG. 3 in reference to which the first embodiment has been described, and the following explanation focuses on the differences from the first embodiment. An exposure control unit 107d compares the largest output value calculated by the highest brightness priority exposure calculation unit 107a with the white reference value calculated by the normal exposure calculation unit 107b to determine which value is greater.

If it is decided that the largest output value is less than the white reference value, the exposure control unit 107d outputs the white reference value calculated by the normal exposure calculation unit 107b to the image processing unit 115. The gradation correction unit 115c then executes gradation conversion processing on the image data by using the gradation conversion characteristics corresponding to the white reference value calculated by the normal exposure calculation unit 107b, as in the first embodiment described earlier. If, on the other hand, the largest output value is judged to be equal to or greater than the white reference value, the exposure control unit 107d outputs a preselected white reference value to the image processing unit 115. The gradation correction unit 115c then executes gradation conversion processing on the image data based upon the preselected white reference value, as in the gradation correction processing in the related art.

Since the specific details of the image processing are switched based upon the comparison results obtained by comparing the largest output value calculated by the highest brightness priority exposure calculation unit 107a with the white reference value calculated by the normal exposure calculation unit 107b, the gradation of the image data can be corrected through gradation correction processing even better suited for the particular photographic scene.

—Variations—

It is to be noted that the digital cameras achieved in the embodiments described above allow for the following variations.

(1) In the first embodiment described earlier, the normal exposure calculation unit 107b outputs the white reference value to the gradation correction unit 115c, which then sets sRGB gradation conversion characteristics so as to allow the input white reference value to assume a brightness value of 255. Instead, the normal exposure calculation unit 107b may output a gray reference value to the gradation correction unit 115c to enable the gradation correction unit 115c to determine the optimal gradation conversion characteristics based upon the gray reference value. Namely, the gradation conversion characteristics may be selected so as to allow the gray reference value to assume a brightness value of 128.

(2) In the first embodiment described earlier, gradation conversion characteristics are set in sRGB 8-bit encoding, so as to set a white reference value assuming a brightness value of 255, and if the photographic scene has a broad dynamic range, knee characteristics are set in order to attenuate the brightness in bright highlighted areas to a level equal to or under the white level. However, the scRGB data format and the RIMM data format allow recording of data with a higher level of brightness than that indicated by the white reference value. Namely, the scRGB data format allows recording of data with a brightness level up to 750% of the white level and the RIMM data format allows recording of data with a brightness level up to 200% of the white level. When processing data in either of these formats, too, gradation conversion should be executed based upon the reference white value obtained via the normal exposure calculation unit 107b so as to convert the data to scRGB or RIMM encoded data.

When processing 16-bit scRGB data, the reference black value should be set to 4096, the white reference value should be set to 12288 and the gradation conversion characteristics should be adjusted so that they are in proportion to the scene brightness level. Accordingly, when the white reference value is W, the gradation correction unit 105c should convert an input pixel value v to an scRGB value v', as expressed in (4) below. It is to be noted that when v'>65535 in expression (4), the value of v' should be clipped to 65535.

$$v' = 4096 + 8192 v/W \quad (4)$$

When encoding RIMM data, a RIMM RGB value c (normalized so that $0 \leq c \leq 2$) is converted as expressed in (5) below, thereby adjusting the number of bits constituting the data to an integer, e.g., 12 bits or 16 bits. It is to be noted that in expression (5) below, $$E_{clip} = 2.0 \text{ and } V_{clip} = 1.099 E_{clip}^{0.45} - 0.99 \quad (5)$$

(3) In the embodiments described above, the digital camera 100 is equipped with the image processing unit 115 so as to enable the execution of gradation correction processing on image data within the digital camera 100. However, the digital camera 100 does not need to include the image processing unit 115 and instead, image data constituting an image photographed under the exposure conditions determined by the highest brightness priority exposure calculation unit 107a may be recorded by appending to the image data the white reference value generated at the normal exposure calculation unit 107b. In this case, an external device fulfilling functions equivalent to those of the image processing unit 115, such as a personal computer, should read the image data appended with the white reference value and execute gradation correction on the image data in correspondence to the white reference value.

Figure 23:
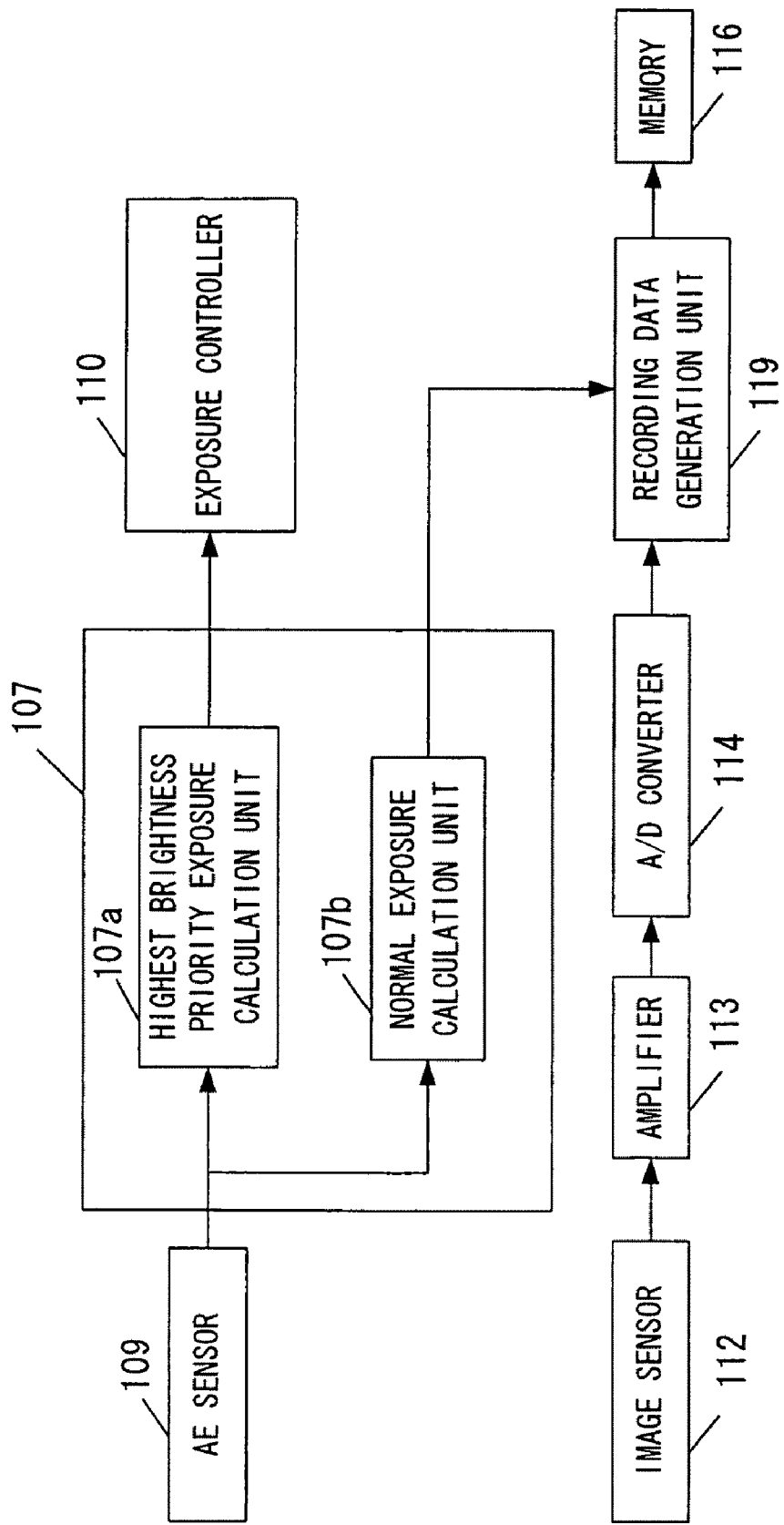
Figure 24:
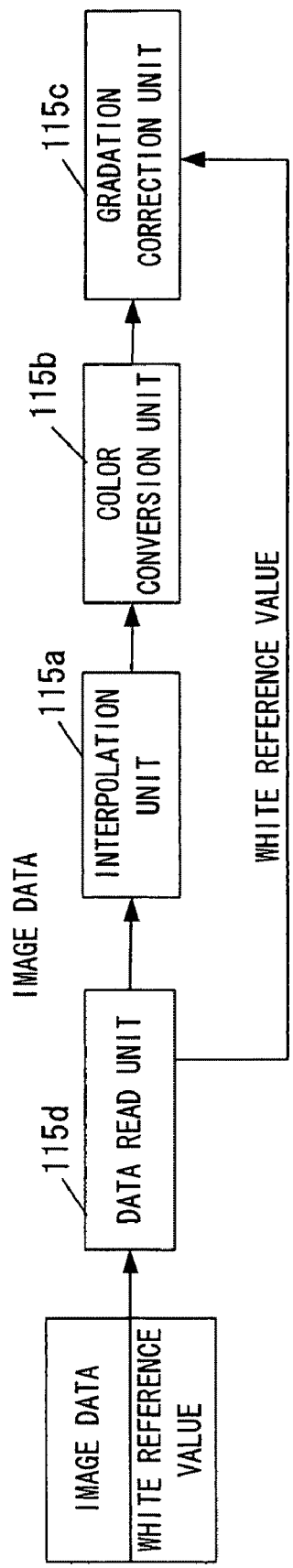

For instance, a recording data generation unit 119 in the digital camera 100 may generate image data by appending the reference white value output from the normal exposure calculation unit 107b to image data output from the A/D converter 114 and record the image data thus generated into the memory 116, as shown in FIG. 23. Then, a data read unit 115d of a personal computer having read the image data recorded in the memory 116 may separate the image data and the white reference value from each other, output the image data to an interpolation unit 115a and output the white reference value to a gradation correction unit 115c, as shown in FIG. 24. It is to be noted that the processing executed via the interpolation unit 115a through the gradation correction unit 115c is identical to that explained in reference to the first embodiment and a repeated explanation is not provided.

Since the structure described above eliminates the need to execute the gradation correction processing in the digital camera 100, the processing load on the digital camera 100 can be reduced.

Figure 25:
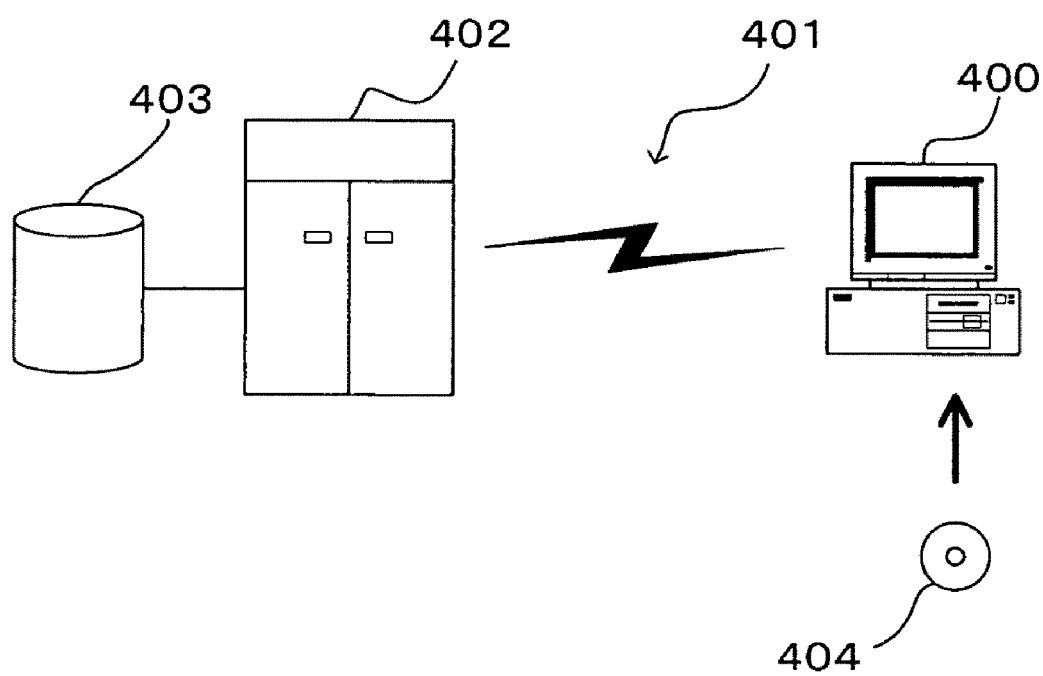

(4) In addition, the present invention may be adopted in a personal computer or the like by providing a program enabling the control described above in a recording medium such as a CD-ROM or as a data signal on the Internet or the like. FIG. 25 illustrates how the program may be provided through such media. A personal computer 400 receives the program via a CD-ROM 404. The personal computer 400 also has a connection capability to connect with a communication line 401. A computer 402 is a server computer that provides the program stored in a recording medium such as a hard disk 403. The communication line 401 may be a communication line such as the Internet connection line, a personal computer communication line or a dedicated communication line. The computer 402 reads out the program from the hard disk 403 and transmits the program thus read out to the personal computer 400 via the communication line 401. Namely, the program may be embodied as a data signal on a carrier wave and transmitted via the communication line 401. In short, the program can be distributed as a computer-readable computer program product assuming any of various modes such as a recording medium and a carrier wave.

While the invention has been particularly shown and described with respect to preferred embodiments and variations thereof by referring to the attached drawings, the present invention is not limited to these examples and it will be understood by those skilled in the art that various changes in form and detail may be made therein without departing from the scope of the invention.

The disclosure of the following priority application is herein incorporated by reference:
Japanese Patent Application No. 2006-219755 filed Aug. 11, 2006

The invention claimed is:

1. A digital camera, comprising:
   a photometering unit that measures brightnesses of a plurality of areas of a photographic field by dividing the photographic field into the plurality of areas;
   a reference value calculation unit that calculates a first reference value to be used to determine exposure conditions for a photographing operation based upon photometering results provided by the photometering unit and also calculates a second reference value, different from the first reference value, to be used to set gradation conversion characteristics in conformance to which gradation correction is to be executed on a photographic image photographed based upon the photometering results;
   an exposure condition determining unit that determines the exposure conditions for the photographing operation based upon the first reference value;
   a gradation conversion characteristics setting unit that sets the gradation conversion characteristics based upon the second reference value; and
   an image processing unit that executes image processing including gradation conversion executed by using the gradation conversion characteristics on the photographic image obtained under the exposure conditions via an imaging unit.

2. A digital camera according to claim 1, further comprising:
   an imaging unit that obtains the photographic image with an image sensor under the exposure conditions, wherein a field of view of the photographic image corresponds to a field of view of the photographic field.

3. A digital camera comprising:
   a photometering unit that measures brightness of a photographic field by dividing the photographic field into a plurality of areas;
   a reference value calculation unit that calculates a first reference value to be used to determine exposure conditions for a photographing operation based upon photometering results provided by the photometering unit and also calculates a second reference value, different from the first reference value, to be used to set gradation conversion characteristics in conformance to which gradation correction is to be executed on a photographic image photographed based upon the photometering results;
   an exposure condition determining unit that determines the exposure conditions for the photographing operation based upon the first reference value;
   a gradation conversion characteristics setting unit that sets the gradation conversion characteristics based upon the second reference value; and
   an image processing unit that executes image processing including gradation conversion executed by using the gradation conversion characteristics on the photographic image obtained under the exposure conditions via an imaging unit, wherein:
   the reference value calculation unit determines a certain area having received a greatest quantity of light among the plurality of areas based upon the photometering results provided by the photometering unit and designates an output value corresponding to the certain area as the first reference value; and
   the reference value calculation unit calculates a white reference value corresponding to a brightness level that can be regarded to indicate white based upon the photometering results provided by the photometering unit and designates a pixel value equivalent to the white reference value as the second reference value.

4. A digital camera according to claim 3, wherein:
   the gradation conversion characteristics setting unit sets the gradation conversion characteristics so that the pixel value corresponding to the second reference value in the photographic image assumes a brightness value indicating white.

5. A digital camera according to claim 4, further comprising:
   a gradation conversion characteristics correction unit that corrects the gradation conversion characteristics by altering a slope of the gradation conversion characteristics at a predetermined point, so that even when the pixel value corresponding to the brightness value indicating white is smaller than a largest pixel value among pixel values at pixels constituting the photographic image, pixel values in a range between the pixel value corresponding to the brightness value indicating white and the largest pixel value in the photographic image do not saturate.

6. A digital camera according to claim 5, wherein:
   the gradation conversion characteristics correction unit alters the slope of the gradation conversion characteristics if a ratio of the first reference value and the second reference value is equal to or greater than a predetermined value.

7. A digital camera according to claim 5, wherein:
   the gradation conversion characteristics correction unit alters the slope of the gradation conversion characteristics if a bright area within the photographic field is large based upon a measurement of the photometering unit.

8. A digital camera according to claim 3, wherein:
   the gradation conversion characteristics setting unit sets gradation conversion characteristics corresponding to an output value from each area among the plurality of areas; and
   the image processing unit executes gradation conversion processing for each area by using the gradation conversion characteristics set by the gradation conversion characteristics setting unit.

9. A digital camera comprising:
a photometering unit that measures brightness of a photographic field by dividing the photographic field into a plurality of areas;
a reference value calculation unit that calculates a first reference value to be used to determine exposure conditions for a photographing operation based upon photometering results provided by the photometering unit and also calculates a second reference value, different from the first reference value, to be used to set gradation conversion characteristics in conformance to which gradation correction is to be executed on a photographic image photographed based upon the photometering results;
an exposure condition determining unit that determines the exposure conditions for the photographing operation based upon the first reference value;
a gradation conversion characteristics setting unit that sets the gradation conversion characteristics based upon the second reference value;
an image processing unit that executes image processing including gradation conversion executed by using the gradation conversion characteristics on the photographic image obtained under the exposure conditions via an imaging unit;
a photographic sensitivity calculation unit that calculates a photographic sensitivity value corresponding to the second reference value; and
a recording unit that records into a recording medium image data that include the photographic image and information indicating the photographic sensitivity value appended to the photographic image.

10. A digital camera comprising:
a photometering unit that measures brightness of a photographic field by dividing the photographic field into a plurality of areas;
a reference value calculation unit that calculates a first reference value to be used to determine exposure conditions for a photographing operation based upon photometering results provided by the photometering unit and also calculates a second reference value, different from the first reference value, to be used to set gradation conversion characteristics in conformance to which gradation correction is to be executed on a photographic image photographed based upon the photometering results;
an exposure condition determining unit that determines the exposure conditions for the photographing operation based upon the first reference value;
a gradation conversion characteristics setting unit that sets the gradation conversion characteristics based upon the second reference value;
an image processing unit that executes image processing including gradation conversion executed by using the gradation conversion characteristics on the photographic image obtained under the exposure conditions via an imaging unit; and
a noise level estimating unit that estimates a noise level indicating a level of noise in the photographic image, wherein:
the exposure condition determining unit determines the exposure conditions for the photographing operation so that a ratio of the first reference value and the second reference value does not exceed a predetermined value corresponding to the noise level estimated by the noise level estimating unit.

11. A digital camera comprising:
a photometering unit that measures brightness of a photographic field by dividing the photographic field into a plurality of areas;
a reference value calculation unit that calculates a first reference value to be used to determine exposure conditions for a photographing operation based upon photometering results provided by the photometering unit and also calculates a second reference value, different from the first reference value, to be used to set gradation conversion characteristics in conformance to which gradation correction is to be executed on a photographic image photographed based upon the photometering results;
an exposure condition determining unit that determines the exposure conditions for the photographing operation based upon the first reference value;
a gradation conversion characteristics setting unit that sets the gradation conversion characteristics based upon the second reference value;
an image processing unit that executes image processing including gradation conversion executed by using the gradation conversion characteristics on the photographic image obtained under the exposure conditions via an imaging unit;
a noise level estimating unit that estimates a noise level indicating a level of noise in the photographic image; and
a noise reducing unit that reduces the noise by applying a noise reducing filter corresponding to the noise level to image data having undergone the image processing at the image processing unit.

12. A digital camera comprising:
a photometering unit that measures brightness of a photographic field by dividing the photographic field into a plurality of areas;
a reference value calculation unit that calculates a first reference value to be used to determine exposure conditions for a photographing operation based upon photometering results provided by the photometering unit and also calculates a second reference value, different from the first reference value, to be used to set gradation conversion characteristics in conformance to which gradation correction is to be executed on a photographic image photographed based upon the photometering results;
an exposure condition determining unit that determines the exposure conditions for the photographing operation based upon the first reference value;
a gradation conversion characteristics setting unit that sets the gradation conversion characteristics based upon the second reference value;
an image processing unit that executes image processing including gradation conversion executed by using the gradation conversion characteristics on the photographic image obtained under the exposure conditions via an imaging unit;
an exposure state measuring unit that measures an actual exposure state manifesting as the imaging unit is engaged in an imaging operation; and
a reference value correction unit that corrects the second reference value based upon the actual exposure state if there is a discrepancy between the actual exposure state measured via the exposure state measuring unit and the exposure conditions determined by the exposure condition determining unit.

13. A digital camera comprising:
a photometering unit that measures brightness of a photographic field by dividing the photographic field into a plurality of areas;
a reference value calculation unit that calculates a first reference value to be used to determine exposure conditions for a photographing operation based upon photometering results provided by the photometering unit and also calculates a second reference value, different from the first reference value, to be used to set gradation conversion characteristics in conformance to which gradation correction is to be executed on a photographic image photographed based upon the photometering results;
an exposure condition determining unit that determines the exposure conditions for the photographing operation based upon the first reference value;
a gradation conversion characteristics setting unit that sets the gradation conversion characteristics based upon the second reference value;
an image processing unit that executes image processing including gradation conversion executed by using the gradation conversion characteristics on the photographic image obtained under the exposure conditions via an imaging unit;
an exposure condition setting unit that sets exposure conditions in response to an instruction issued by a user; and
a reference value correction unit that corrects the second reference value based upon the exposure conditions having been set via the exposure condition setting unit.

14. A digital camera comprising:
a photometering unit that measures brightness of a photographic field by dividing the photographic field into a plurality of areas;
a reference value calculation unit that calculates a first reference value to be used to determine exposure conditions for a photographing operation based upon photometering results provided by the photometering unit and also calculates a second reference value, different from the first reference value, to be used to set gradation conversion characteristics in conformance to which gradation correction is to be executed on a photographic image photographed based upon the photometering results;
an exposure condition determining unit that determines the exposure conditions for the photographing operation based upon the first reference value;
a gradation conversion characteristics setting unit that sets the gradation conversion characteristics based upon the second reference value;
an image processing unit that executes image processing including gradation conversion executed by using the gradation conversion characteristics on the photographic image obtained under the exposure conditions via an imaging unit;
a photographic sensitivity setting unit that sets a photographic sensitivity level in response to an instruction issued by a user;
an altering unit that alters an amplification factor and the exposure conditions having been determined by the exposure condition determining unit based upon a ratio of the first reference value and the second reference value calculated in correspondence to the setting selected at the photographic sensitivity setting unit; and
a signal amplifier unit that amplifies image signals obtained via the imaging unit at the amplification factor having been altered via the altering unit.

15. A digital camera according to claim 14, further comprising:
a photographic sensitivity calculation unit that calculates a photographic sensitivity value corresponding to the amplification factor having been altered by the altering unit and the second reference value; and
a recording unit that records into a recording medium image data that include the photographic image and information indicating the photographic sensitivity value appended to the photographic image.

16. A digital camera comprising:
a photometering unit that measures brightness of a photographic field by dividing the photographic field into a plurality of areas;
a reference value calculation unit that calculates a first reference value to be used to determine exposure conditions for a photographing operation based upon photometering results provided by the photometering unit and also calculates a second reference value, different from the first reference value, to be used to set gradation conversion characteristics in conformance to which gradation correction is to be executed on a photographic image photographed based upon the photometering results;
an exposure condition determining unit that determines the exposure conditions for the photographing operation based upon the first reference value;
a gradation conversion characteristics setting unit that sets the gradation conversion characteristics based upon the second reference value; and
an image processing unit that executes image processing including gradation conversion executed by using the gradation conversion characteristics on the photographic image obtained under the exposure conditions via an imaging unit, wherein:
the photometering unit assumes a plurality of sets of different spectral sensitivity characteristics; and
the digital camera further comprises a photometering results correction unit that corrects the photometering results provided by the photometering unit if a spectral sensitivity of the photometering unit and a spectral sensitivity of the imaging unit do not match.

17. A digital camera comprising:
a photometering unit that measures brightness of a photographic field by dividing the photographic field into a plurality of areas;
a reference value calculation unit that calculates a first reference value to be used to determine exposure conditions for a photographing operation based upon photometering results provided by the photometering unit and also calculates a second reference value, different from the first reference value, to be used to set gradation conversion characteristics in conformance to which gradation correction is to be executed on a photographic image photographed based upon the photometering results;
an exposure condition determining unit that determines the exposure conditions for the photographing operation based upon the first reference value;
a gradation conversion characteristics setting unit that sets the gradation conversion characteristics based upon the second reference value;
an image processing unit that executes image processing including gradation conversion executed by using the gradation conversion characteristics on the photographic image obtained under the exposure conditions via an imaging unit;

a light emission unit that emits light as an image is captured via the imaging unit;

a light emission quantity detection unit that detects a quantity of light emitted from the light emission unit; and a reference value correction unit that corrects the second reference value based upon detection results provided by the light emission quantity detection unit.

18. A digital camera comprising:

a photometering unit that measures brightness of a photographic field by dividing the photographic field into a plurality of areas;

a reference value calculation unit that calculates a first reference value to be used to determine exposure conditions for a photographing operation based upon photometering results provided by the photometering unit and also calculates a second reference value, different from the first reference value, to be used to set gradation conversion characteristics in conformance to which gradation correction is to be executed on a photographic image photographed based upon the photometering results;

an exposure condition determining unit that determines the exposure conditions for the photographing operation based upon the first reference value;

a gradation conversion characteristics setting unit that sets the gradation conversion characteristics based upon the second reference value;

an image processing unit that executes image processing including gradation conversion executed by using the gradation conversion characteristics on the photographic image obtained under the exposure conditions via an imaging unit;

a face detection unit that detects a face area containing a person's face in the image obtained via the imaging unit; and a reference value correction unit that corrects the second reference value based upon an output value from the face area having been obtained through measurement executed by the photometering unit.

19. A digital camera comprising:

a photometering unit that measures brightness of a photographic field by dividing the photographic field into a plurality of areas;

a reference value calculation unit that calculates a first reference value to be used to determine exposure conditions for a photographing operation based upon photometering results provided by the photometering unit, and also calculates a second reference value, different from the first reference value, to be used to set gradation conversion characteristics in conformance to which gradation correction is to be executed on a photographic image photographed based upon the photometering results;

an exposure condition determining unit that determines the exposure conditions for the photographing operation based upon the first reference value;

a gradation conversion characteristics setting unit that compares the first reference value with the second reference value, sets the gradation conversion characteristics based upon the second reference value if the first reference value is less than the second reference value and sets preselected gradation conversion characteristics if the first reference value is equal to or greater than the second reference value; and an image processing unit that executes image processing including gradation conversion executed by using the gradation conversion characteristics on the photographic image obtained under the exposure conditions via an imaging unit.

20. A digital camera comprising:

a photometering unit that measures brightnesses of a plurality of areas of a photographic field by dividing the photographic field into the plurality of areas;

a reference value calculation unit that calculates a reference value to be used to set gradation conversion characteristics in conformance to which gradation correction is to be executed on a photographic image;

an exposure condition determining unit that determines exposure conditions for a photographing operation; and a recording unit that records into a recording medium image data that include the photographic image obtained under the exposure conditions and the reference value appended to the photographic image.

21. A non-transitory image processing computer program product having contained therein an image processing program that enables a computer to execute:

a read step in which the image data according to claim 20 are read;

a gradation conversion characteristics setting step in which gradation conversion characteristics are set for the photographic image included in the image data having been read based upon the reference value; and an image processing step in which image processing, including gradation conversion executed by using the gradation conversion characteristics, is executed on the photographic image.

22. A digital camera according to claim 20, further comprising:

an imaging unit that obtains the photographic image with an image sensor under the exposure conditions, wherein a field of view of the photographic image corresponds to a field of view of the photographic field.

23. A non-transitory image processing computer program product having contained therein an image processing program that enables a computer to execute:

a reference value calculation step in which a first reference value to be used to determine exposure conditions for a photographing operation based upon photometering results obtained by measuring brightnesses of a plurality of areas of a photographic field divided into the plurality of areas is calculated and a second reference value, different from the first reference value, to be used to set gradation conversion characteristics in conformance to which gradation correction is to be executed on a photographic image photographed with an image sensor based upon the photometering results, is calculated;

a read step in which image data obtained by photographing the image based upon the photometering results are read;

a gradation conversion characteristics setting step in which gradation conversion characteristics are set for the photographic image included in the image data having been read based upon the second reference value appended to the photographic image; and an image processing step in which image processing, including gradation conversion executed by using the gradation conversion characteristics, is executed on the photographic image.

* * * * *